US010000880B1

(12) United States Patent
Borchard et al.

(10) Patent No.: US 10,000,880 B1
(45) Date of Patent: Jun. 19, 2018

(54) LAUNDRY WASH WATER RECYCLE SYSTEM

(71) Applicants: Charles A. Borchard, Rocklin, CA (US); Gregory W. Evans, Davis, CA (US); Christopher M. Borchard, Citrus Heights, CA (US); Steven M. Samudio, Fair Oaks, CA (US)

(72) Inventors: Charles A. Borchard, Rocklin, CA (US); Gregory W. Evans, Davis, CA (US); Christopher M. Borchard, Citrus Heights, CA (US); Steven M. Samudio, Fair Oaks, CA (US)

(73) Assignee: New Wave Industries, North Highlands, CA (US)

( * ) Notice: Subject to any disclaimer, the term of this patent is extended or adjusted under 35 U.S.C. 154(b) by 0 days. days.

(21) Appl. No.: 15/392,779

(22) Filed: Dec. 28, 2016

Related U.S. Application Data

(62) Division of application No. 14/676,421, filed on Apr. 1, 2015.

(51) Int. Cl.
| | |
|---|---|
| *C02F 9/00* | (2006.01) |
| *D06F 39/00* | (2006.01) |
| *C02F 1/00* | (2006.01) |
| *C02F 1/78* | (2006.01) |
| *C02F 1/38* | (2006.01) |
| *C02F 103/00* | (2006.01) |

(52) U.S. Cl.
CPC ............ *D06F 39/006* (2013.01); *C02F 1/008* (2013.01); *C02F 9/00* (2013.01); *C02F 1/38* (2013.01); *C02F 1/78* (2013.01); *C02F 2103/002* (2013.01); *C02F 2201/782* (2013.01)

(58) Field of Classification Search
CPC ....................................................... C02F 1/008
See application file for complete search history.

(56) References Cited

U.S. PATENT DOCUMENTS

| 5,667,683 A | * | 9/1997 | Benian | ................... | B01D 29/15 |
| | | | | | 210/409 |
| 6,006,387 A | * | 12/1999 | Cooper | ................... | A61L 2/202 |
| | | | | | 68/13 R |
| 6,346,069 B1 | * | 2/2002 | Collier | ...................... | B04B 1/02 |
| | | | | | 210/112 |

(Continued)

*Primary Examiner* — Peter Keyworth
(74) *Attorney, Agent, or Firm* — Dennis A. DeBoo

(57) ABSTRACT

Laundry wash water recycle system comprising a repressurization pump in fluid communication with a storage tank containing previously used wash water for pumping the used wash water sequentially through a lint filter, a cyclone, and a multi-media filter disposed in sequential series wherein the self-cleaning lint filter in sequential series combination with the cyclone removes insoluble solids with the multi-media filter providing a final filtration for obtaining an output of pressurized double filtered cyclonically processed water. An advanced oxidation combination is introduced into pressurized double filtered cyclonically processed water and mixing occurs for producing a double filtered cyclonically processed advanced oxidation treated water that is communicated to a clean water storage tank for providing on demand delivery to at least one washer and continuous delivery of a feedback flow to the inlet storage tank for providing constant recirculation of treated water through the system.

6 Claims, 19 Drawing Sheets

(56) References Cited

U.S. PATENT DOCUMENTS

| | | | |
|---|---|---|---|
| 6,474,111 B1 * | 11/2002 | Pattee | A47L 15/4291 134/111 |
| 2004/0129653 A1 * | 7/2004 | Spruce | C02F 1/288 210/807 |
| 2013/0213895 A1 * | 8/2013 | Criswell | B01D 21/01 210/709 |

* cited by examiner

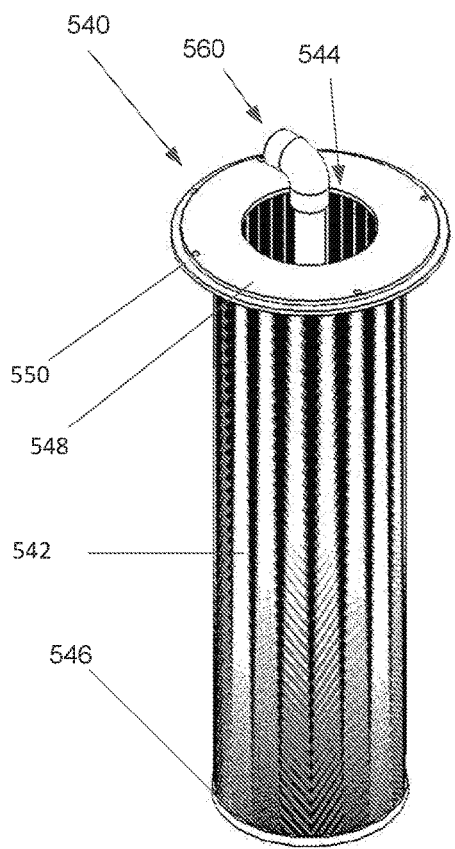
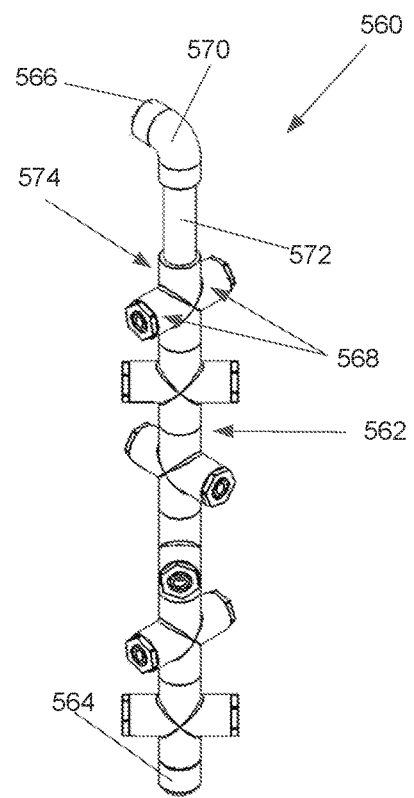
FIG. 7
FIG. 8
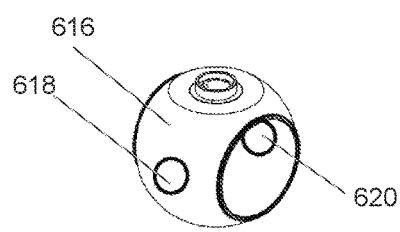
FIG. 9

LAUNDRY WASH WATER RECYCLE SYSTEM

CROSS-REFERENCE TO RELATED APPLICATIONS

This application is a divisional application of, and claims the benefit of priority under 35 U.S.C. § § 120 and 121 to, U.S. application Ser. No. 14/676,421, filed Apr. 1, 2015, currently pending, and which is hereby incorporated by reference herein in its entirety.

FIELD OF THE INVENTION

This invention relates to a laundry wash water recycle system utilized for collecting and treating laundry wash water from commercial (for example, hotel, hospital, nursing home, et cetera.) and industrial (for example, uniforms, professional laundry services, et cetera.) washing machines so that it can be re-used effectively and safely by the washing machines.

BACKGROUND OF THE INVENTION

Some large, industrial laundry wash operators have used wash water recycle systems to reduce the amount of fresh water required by washers and the amount of water discharged from the washers to minimize the cost of municipal water and sewer charges. These large recycle systems also recover some of the heat used to produce hot water to conserve energy consumption. Typically, these large systems are complex (similar to a municipal treatment plant) with a large footprint and further require frequent operator attention and water treatment knowledge in order to operate effectively.

Smaller recycle treatment systems have recently been introduced to treat wash wastewater from small to mid-size operators (less than about 100,000 gallons of water use per day), but these smaller systems remain problematic and disadvantageous because, inter alia, they still require frequent operator attention for monitoring and maintenance.

For example, the typical smaller recycle treatment system comprises a vibrating shaker screen that requires frequent operator attention for both monitoring and maintenance. These smaller recycle treatment systems also typically employ UV treatment for biological control utilizing UV bulbs and further employ absorbent media filters for filtering thereby resulting in high maintenance and replacement costs associated with the bulbs and filters.

Additionally, these smaller recycle treatment systems typically require that the equipment be insulated in order to conserve heat from the wash water thereby requiring the need for insulation which increases cost of the equipment and limits access for maintenance purposes. Typically, these systems also employ chemical addition for coagulation of fine solids as a filter aid thereby resulting in the cost of the coagulant chemicals and the disposal of the increase in the amount of waste sludge produced thereby.

Furthermore, these smaller recycle treatment systems are problematic and disadvantageous because they require large footprints to accommodate water storage tanks and treatment equipment including transfer pumps and media filters.

Consequently, the size and complexity of these smaller recycle systems make them difficult for small to mid-size wash operators to purchase, install, operate, and maintain because they still require a high amount of skilled operator attention, a large footprint, and high overall system maintenance and operating costs due to, for example, the cost employing skilled maintenance and operating personal and also the cost of replacement parts. These smaller recycle treatment systems are also problematic and disadvantageous because large amounts of water are stored and remain stagnant during non-production hours, increasing the chance of water quality degradation.

Notwithstanding, water has become an ever increasing limited commodity and an ever increasing operating expense to the operators of laundry wash systems. Additionally, some local municipalities charge water, sewer, and connection fees that make reclaiming water from the laundry wash a necessity to keep operating expenses within budget for the laundry wash operator.

For the foregoing reasons, there is a need for a laundry wash water recycle system that, inter alia, ameliorates or overcomes one or more of the significant shortcomings delineated hereinabove.

BRIEF SUMMARY OF THE INVENTION

Accordingly, and in one aspect, an embodiment of the invention ameliorates or overcomes one or more of the significant shortcomings delineated hereinabove by providing a laundry wash water recycle system that provides a total system approach of initially producing a wastewater from at least one washer machine that is easier to treat and delivering the wastewater to an inlet water tank, then sequentially lint filtering, cyclonically processing, and media filtering the wastewater from the inlet water tank to obtain filtered and cyclonically processed water, and then introducing an advanced oxidation combination into the filtered and cyclonically processed water and mixing prior to communicating the filtered, cyclonically processed, and advanced oxidation treated water to a clean water tank that feeds clean water to the at least one washer machine upon demand while simultaneously providing a continuous recirculating or feeding back a stream of the filtered, cyclonically processed, and advanced oxidation treated water to the inlet water tank via a feedback line for providing constant recirculation of the advanced oxidation treated water through the system.

In another aspect, an embodiment of the invention provides a laundry wash water recycle system in fluid communication with at least one washer machine having a wastewater outlet, the system comprising: 1) a washer ozone generator for entraining ozone into laundry wash water of the at least one washer machine for use in the wash cycle thereof for obtaining used ozone treated wash water; 2) a collection sump in fluid communication with the wastewater outlet of the at least one washer machine for receiving discharged used ozone treated wash water from the at least one washer; 3) an inlet tank having an inlet channel and an outlet channel; 4) a sump pump having a suction side operatively coupled to said collection sump and an output side operatively coupled to said inlet channel of said inlet tank for pumping used ozone treated wash water into said inlet tank from said collection sump under the orchestration of a control system; 5) a repressurization pump having a suction inlet side and a repressurization outlet side, said suction inlet side operatively coupled to said outlet channel of said inlet tank receiving and storing laundry wash water; 6) a series device configuration comprising: 7) a self-cleaning lint filter device having a lint filter inlet channel and a lint filter outlet channel, said lint filter inlet channel operatively coupled to said repressurization outlet side of said repressurization pump; 8) a cyclone assembly having an inlet port and an outlet port, said inlet port operatively coupled to said lint filter outlet channel of said self-cleaning lint filter device; and 9) a multi-media filter having an inlet passage and an outlet passage, said inlet passage of said multi-media filter operatively coupled to said outlet port of said cyclone wherein said repressurization pump provides pumping of the wastewater through said series configuration, for delivering double filtered cyclonically processed water from said outlet passage of said multi-media filter; 10) a clean water tank having an input channel and an output channel, said input channel of said clean water tank operatively coupled to the outlet passage of the multi-media filter for receiving said double filtered cyclonically processed water; 11) an advanced oxidation means for treating said double filtered cyclonically processed water prior to entering said clean water tank for providing a double filtered cyclonically processed advanced oxidation treated water to said clean water tank; 12) a clean water feedback line having a first end and a second end, said first end operatively coupled to said inlet tank; and 13) a single clean water pump having an input operatively coupled to said output channel of said clean water tank and an output operatively coupled to said second end of said clean water feedback line and to the at least one washer machine; and 14) a variable frequency drive (VFD) operatively coupled to said single clean water pump for variably controlling said clean water pump for pumping said advanced oxidation treated double filtered and cyclonically processed water from said clean water tank to the at least one washer machine upon demand while continually recirculating or feeding back a stream of said advanced oxidation treated double filtered and cyclonically processed water through said clean water feedback line from said clean water tank to the inlet water tank for providing constant recirculation of said advanced oxidation treated double filtered and cyclonically processed water through said system utilizing said single clean water pump.

In another aspect, the above delineated laundry wash water recycle system is provided wherein utilizing the washer ozone generator for entraining ozone into laundry wash water of at least one washer machine for use in the wash cycle thereof for obtaining used ozone treated wash water is omitted.

In another aspect, an embodiment of the invention provides a laundry wash water recycle process comprising the steps of: 1) utilizing ozone treatment in wash water of at least one washer; 2) transferring under pressure used ozone treated wash water from the at least one washer to an inlet storage tank defining stored previously ozone treated used wash water; 3) repressurizing the stored previously ozone treated used wash water for defining repressurized used wash water; 4) feeding the repressurized used wash water sequentially through a lint filter, at least one cyclone, and a multi-media filter disposed in sequential series wherein the self-cleaning lint filter in sequential series combination with the at least one cyclone are utilized to remove insoluble solids with the multi-media filter providing a final filtration for obtaining an output of pressurized double filtered cyclonically processed water; 5) introducing an advanced oxidation combination comprising hydrogen peroxide and ozone gas into the outputted pressurized double filtered cyclonically processed water for producing a hydroxyl radical oxidizer therein so to obtain a double filtered cyclonically processed advanced oxidation treated water; 6) communicating the double filtered cyclonically processed advanced oxidation treated water to a clean water storage tank; 7) delivering from the clean water storage tank the double filtered cyclonically processed advanced oxidation treated water on demand to at least one washer; and 8) continuously feeding back a stream of the double filtered cyclonically processed advanced oxidation treated water to the inlet storage tank that stores previously ozone treated used wash water for providing a constant recirculation of the feedback stream of the double filtered cyclonically processed advanced oxidation treated water by mixing with the stored previously ozone treated used wash water in the storage tank for subsequent repressurizing and feeding sequentially through the lint filter, the at least one cyclone, and the multi-media filter disposed in sequential series followed by again introducing the advanced oxidation into the double filtered cyclonically processed advanced oxidation treated water prior to the delivery to the clean water storage tank.

In another aspect, the above delineated laundry wash water recycle process is provided wherein the step of utilizing ozone treatment in wash water of at least one washer is omitted.

By constantly recycling and treating new and accumulated wastewater, the water never is allowed to become stagnant and allow additional bacterial growth. Also, constantly recirculating treated water keeps the recycle equipment cleaner, reducing maintenance. Furthermore, the advanced oxidation assembly of the laundry wash water recycle system provides a more complete disinfection than UV, plus it oxidizes wash chemicals and dissolved organic contaminants more thoroughly, eliminating the need for absorbent materials.

Additionally, the laundry wash water recycle system provides ozone in the at least one washer machine during wash cycles to reduce the amount of wash chemicals required, making the wastewater from the at least one washer machine easier to treat and allowing the laundry wash water to be operated at ambient water temperature, saving energy in heating the water and reducing the cost of recycle equipment because no insulation is required.

Furthermore, the self-cleaning lint filter device of the laundry wash water recycle system is used along with the cyclone assembly to remove the bulk of the insoluble solids without the need of coagulants. The multi-media filter, without the use of an absorbent material, of the laundry wash water recycle system is then used for final filtration.

Moreover, all three of these filtration devices are charged by the system using a single pump, the repressurization pump, therefore eliminating the need of additional water storage and transfer pumps.

Accordingly, it should be apparent that numerous modifications and adaptations may be resorted to without departing from the scope and fair meaning of the claims as set forth herein below following the detailed description of the invention.

BRIEF DESCRIPTION OF THE DRAWINGS

FIG. 7 is a perspective view of an embodiment of the cylindrical wedge-wire screen device circumscribing the spray nozzle assembly of the self-cleaning lint filter device.

FIG. 8 is a perspective view of the spray nozzle assembly of the self-cleaning lint filter device.

FIG. 9 is a perspective view of an embodiment of a ball valve of an underflow motorized ball valve assembly of the cyclone system of the of the laundry wash water recycle system wherein the ball valve is configured with opposing orifices disposed in the normally closed faces of the ball valve wherein a central axis of the opposing orifices is, but not limited to, a location that is general perpendicular to a central axis of the opened faces of a normal passageway extending through the ball valve.

DETAILED DESCRIPTION OF THE INVENTION

Figure 1:
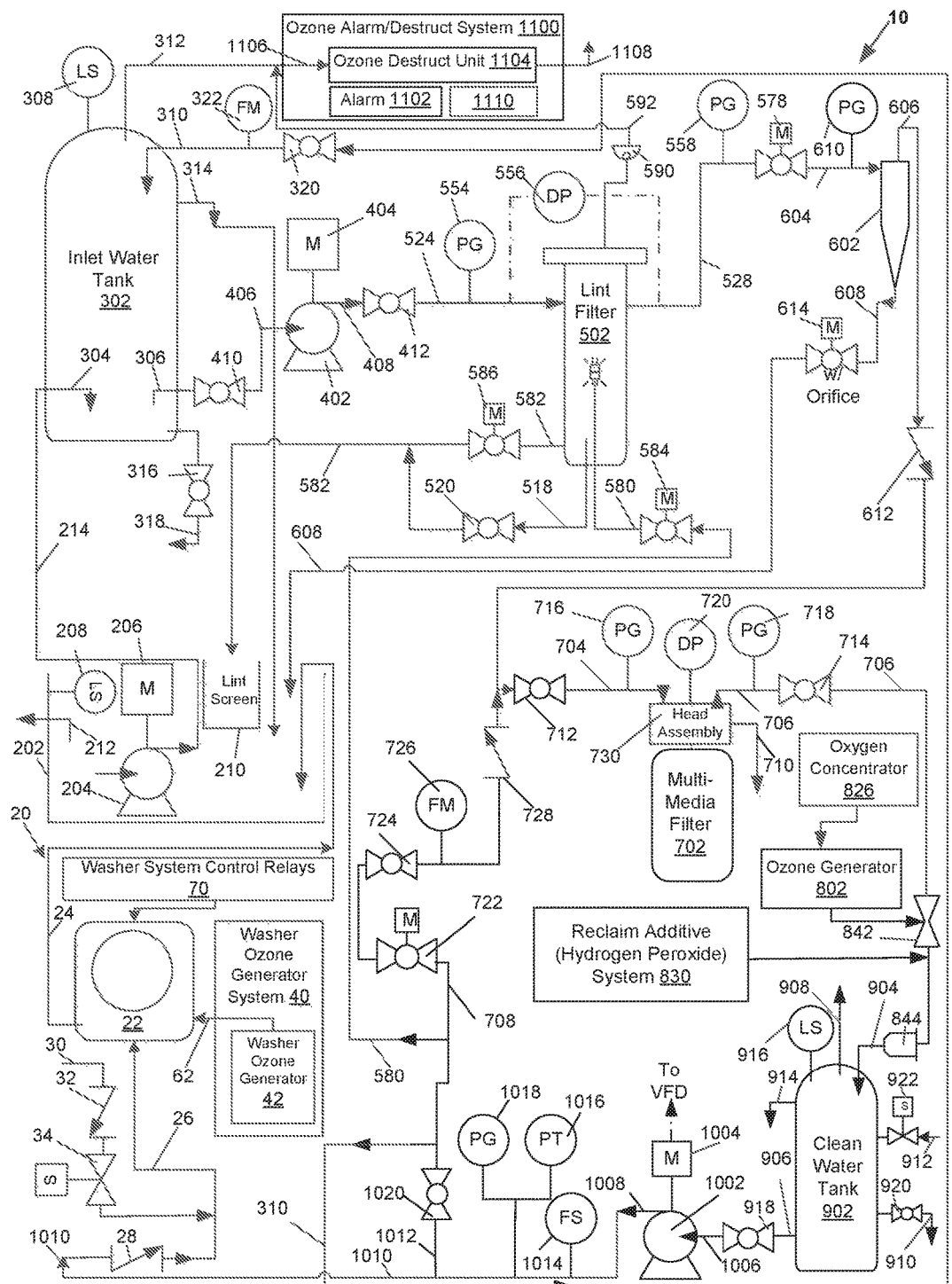
FIG. 1 is a process and instrumentation diagram view of an embodiment of a laundry wash water recycle system.

Considering the drawings, wherein like reference numerals denote like parts throughout the various drawing figures, reference numeral 10 is directed to a laundry wash water recycle system: apparatus and method.

Overview

Referring to FIG. 1, an embodiment of the laundry wash water recycle system 10 is operatively coupled to and in fluid communication with a washer system 20 for washing dirty clothes and linen. The washer system 20 can be of various sizes comprising one or more washing units or machines 22 with one or more of the machines 22 being in fluid communication with the system 10 for discharging wastewater or used wash water to the system 10 to be treated and returned to the one or more washing units or machines 22 as all or part of the make-up water needed to laundry dirty clothes and linen wherein the one or more washing units or machines 22 can be in the form of, but not limited to, commercial (for example, hotel, hospital, nursing home, et cetera.) and industrial (for example, uniforms, professional laundry services, et cetera.) washing machines.

In one embodiment, the one or more washing units or machines 22 are operatively coupled to a washer ozone generator system 40 for providing a controlled entraining of ozone into the laundry wash water of one or more of the washing units or machines 22 for use in the wash cycle thereof.

Figure 2:
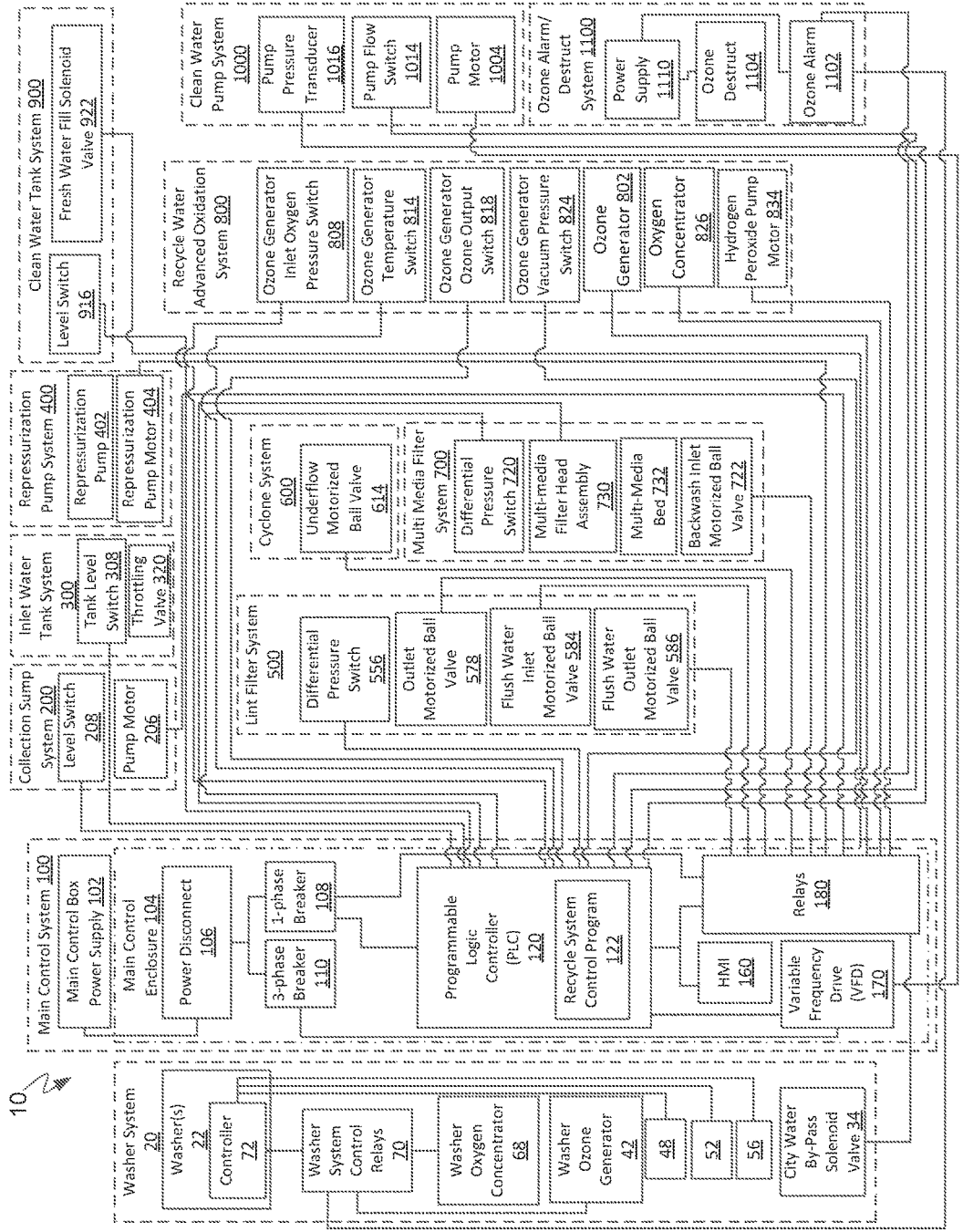
FIG. 2 is a block diagram view of the laundry wash water recycle system shown operatively coupled to an embodiment of a washer system comprising at least one washer.

Referring to FIGS. 1 and 2, the laundry wash water recycle system 10 further comprises a main control system 100, a collection sump system 200 comprising a collection sump 202 with a sump pump 204 disposed therein. The collection sump 202 is in fluid communication with a wastewater outlet of the one or more of the washing units or machines 22 for receiving used wash water or used ozone treated wash water therefrom. The system 10 further comprises an inlet water tank system 300 having an inlet water tank 302 is in fluid communication with the sump pump 204 for receiving the used wash water or used ozone treated wash water from the collection sump 202 to the inlet water tank 302 via the sump pump 204 under the orchestration of the control system 100.

The laundry wash water recycle system 10 further comprises a repressurization pump system 400, a self-cleaning lint filter system 500, a cyclone system 600, a multi-media filter system 700, a recycle water advanced oxidation system 800, a clean water tank system 900, and a clean water pump system 1000.

The self-cleaning lint filter system 500 has an input operatively coupled to the pump system 400 and an output operatively coupled to an input of the cyclone system 600 which, in turn, has an output operatively coupled to an input of the multi-media filter system 700 for pumping, via a repressurization pump 402 of the pump system 400, the used wash water or used ozone treated wash water sequentially through the lint filter, cyclone, and multi-media filter systems 500, 600, 700 respectively, under the orchestration of the control system 100, for delivering doubled filtered cyclonically processed water from an output of the multi-media filter system 700 to a clean water tank 902 of clean water tank system 900.

As noted above, an embodiment of the laundry wash water recycle system 10 further comprises the advanced oxidation system 800 for introducing an advanced oxidation combination into pressurized double filtered cyclonically processed water and utilizing a mixer 844 for mixing and producing a double filtered cyclonically processed advanced oxidation treated water that is communicated to the clean water storage tank 902.

In turn, the above noted clean water pump system 1000 comprises a clean water pump 1002 driven by pump motor 1004 under the orchestration of the control system 100 for pumping the double filtered cyclonically processed advanced oxidation treated water from the clean water tank 902 to the of one or more of the washing units or machines 22 upon demand while continually recirculating or feeding back a stream of the double filtered cyclonically processed advanced oxidation treated water from the clean water tank 902 to the inlet water tank 302 for providing constant recirculation of treated water through the system 10. In one embodiment, the laundry wash water recycle system 10 further comprises an ozone alarm and destruct system 1100.

Wash System 20

More specifically, and referring to FIGS. 1 and 2, an embodiment of the laundry wash water recycle system 10 is operatively coupled to and in fluid communication with one or more washing units or machines 22 utilized to laundry dirty clothes and linen. The wastewater or used wash water from the washing operation is discharged to the laundry wash water recycle system 10 to be treated and returned thereby as all or part of the make-up water needed to wash dirty clothes and linen. In particular, at least one washer drain line 24 is operatively coupled in fluid communication between the one or more washing machines 22 and the collection sump 202 to allow the wastewater to flow from the one or more washing machines 22 to the collection sump 202 of the collection sump system 200. Washer drain line 24 is sized to handle the maximum wastewater flow and be accessible for cleaning. Additionally, washer drain line 24 terminates below a predefined low level within the collection sump 202 to prevent excessive suds creation.

Typically, the one or more washing units or machines 22 are customer supplied devices of varying capacity to laundry a wide variety of dirty clothes and linen.

Washer system 20 further comprises a washer water intake line 26 that is operatively coupled in fluid communication with a clean water pump 1002 via a washer treated water line check valve 28 for providing entry of treated recycled water returned by the system 10 and/or fresh water to be used by the one or more washing machines 22 to wash dirty clothes and linen.

The city or fresh water is provided to the one or more washing units or machines 22 by a city water by-pass line 30 that connects the source of the fresh water to the washer water intake line 26 at a location after the washer treated water line check valve 28 so as to prevent fresh water from the city water by-pass line 30 to flow into the clean water pump system 1000. The city water by-pass line 30 is sized to allow the maximum make-up water needed by the one or more washing units or machines 22.

Additionally, the washer system 20 comprises a city water by-pass check valve 32 installed on the city water by-pass line 30 to prevent backflow of treated recycle water from the clean water pump system 1000 into the source of the fresh water. The city water by-pass check valve 32 is typically a flapper type check valve and is sized the same as the city water by-pass line 30.

Furthermore, the washer system 20 comprises a city water by-pass check solenoid valve 34 installed on the city water by-pass line 30 and operatively coupled to the control system 100 for opening the valve 34 for allowing fresh water to flow to the one or more washing units or machines 22 and for closing the valve 34 for precluding fresh water to flow to the one or more washing units or machines 22. The valve 34 is a normally open valve to allow flow of fresh water in case the system 10 is inoperable.

Washer Ozone Generator System 40

Figure 3:
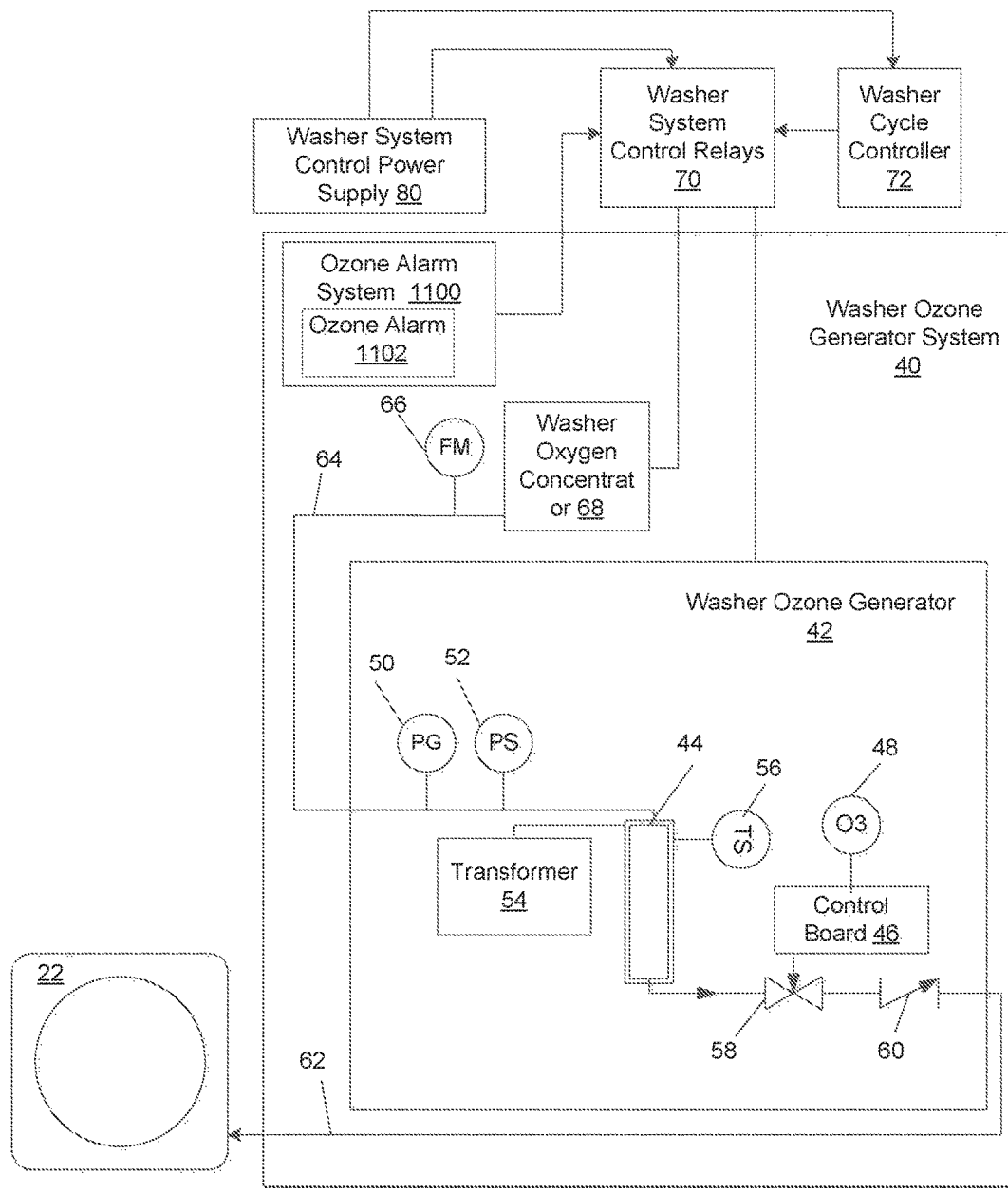
FIG. 3 is a process and instrumentation diagram view of an embodiment of a washer ozone generator system of the laundry wash water recycle system.

Referring to FIG. 3, an embodiment of the laundry wash water recycle system 10 further comprises the washer ozone generator system 40 comprising the washer ozone generator 42. The washer ozone generator 42 comprises a corona discharge ozone cell 44 that produces high volumes and concentrations of ozone. A washer ozone generator ozone line 62 is operatively coupled between the washer ozone generator 42 and the one or more washing units or machines 22 to allow flow of the concentrated ozone/oxygen gas produced by the corona discharge ozone cell 44 to flow into the one or more washing units or machines 22 to be used in the wash cycles. Ozone line 62 terminates in the water basin of each machine and the gas bubbles up through the water and cloths or linens during the wash cycles. The ozone line 62 is made of a material that is ozone compatible and sized to allow the full flow from the washer ozone generator 42.

The washer ozone generator 42 comprises a control board 46 electrically coupled to the corona discharge ozone cell 44. In turn, the ozone cell 44 is operatively coupled to the oxygen concentrator 68 via oxygen line 64 that has a pressure gauge 50 and a pressure switch 52 disposed therein. A transformer 54 powers the corona discharge ozone cell 44 which has a temperature switch 56 coupled thereto. The output line 62 of the corona discharge ozone cell 44 has coupled therein a needle valve 58 for adjustment followed by check valve 60. Additionally, the control board 46 is equipped with an ozone fault indicator 48 and operatively coupled to a programmable logic controller (PLC) device 120.

The washer ozone generator 42 utilizes the washer ozone generator inlet pressure switch 52, washer ozone generator temperature switch 56, and washer ozone generator ozone output switch 48 to optimize the operation of and to protect the washer ozone generator control board 46, the washer ozone generator transformer 54, and the washer ozone generator corona discharge ozone cell 44.

The on/off operation of the washer ozone generator 42 is controlled by a signal from the washer cycle controller 72 and the ozone alarm 1101 of the ozone alarm and destruct system 1100.

The components of the washer ozone generator system 40 will now be explored in further detail starting with the components comprising the washer ozone generator 42.

Washer Ozone Generator Corona Discharge Ozone Cell 44

The washer ozone generator corona discharge ozone cell 44 is a dielectric chamber that produces a high energy, electric arc when subjected to high voltage. This high energy arc or field will cause oxygen molecules (O2) to split into individual oxygen atoms when they flow though the field. Some of these oxygen atoms will combine with oxygen molecules and form ozone (O3).

Washer Ozone Generator Control Board 46

The washer ozone generator control board 46 is used to control the production of ozone by monitoring the voltage from the washer ozone generator transformer 54 to the washer ozone generator corona discharge ozone cell 44. A rheostat for the washer ozone generator control board 46 can be adjusted between 0-100% to vary the amount of ozone generated by varying the voltage from the washer ozone generator transformer 54 to the washer ozone generator corona discharge ozone cell 44.

Washer Ozone Generator Ozone Output Switch 48

The ozone output switch 48 monitors the voltage from the washer ozone generator transformer 54 to the corona discharge ozone cell 44. If the voltage is out of range, then a signal is provided to the control board 46 to stop the production of ozone for a preset time or until powering of the washer ozone generator 42 is cycled off and on to protect the components within the washer ozone generator 42. If the voltage is in range, then ozone production continues as normal.

Washer Ozone Generator Inlet Oxygen Pressure Gauge 50

The washer ozone generator inlet oxygen pressure gauge 50 provides a visual reference of the pressure of oxygen entering the washer ozone generator 42 from the washer oxygen concentrator 68. The pressure can be manually adjusted and set using the washer ozone generator needle valve 58 and seen using the washer ozone generator inlet oxygen pressure gauge 50.

Washer Ozone Generator Inlet Oxygen Pressure Switch 52

The washer ozone generator inlet oxygen pressure switch monitors the pressure of the oxygen entering the washer ozone generator 42 from the washer oxygen concentrator 68. If the pressure is below a setpoint of the switch indicating low flow or a leak of oxygen from the washer oxygen concentrator 68, then the switch 52 will provide a signal to stop the production of ozone so as not to harm any of the components within the washer ozone generator 42. If the pressure is at or above the setpoint, then ozone production can continue as normal.

Washer Ozone Generator Transformer 54

The washer ozone generator transformer 54 takes incoming power and transforms it into a very high voltage/low amperage power source for the washer ozone generator corona discharge ozone cell 44. The use of high voltage produces arcing within the washer ozone generator corona discharge ozone cell 44 that produces high volumes and concentrations of ozone gas when a highly concentrated stream of oxygen is passed within the cell.

Washer Ozone Generator Temperature Switch 56

The washer ozone generator temperature switch 56 monitors the temperature of the washer ozone generator corona discharge ozone cell 44 and the overall washer ozone generator 42 to protect the components of the washer ozone generator 42. If the temperature meets or exceeds the setpoint, a signal from the switch will stop the production of ozone. When the temperature decreases below the setpoint, ozone production will continue as normal.

Washer Ozone Generator Needle Valve 58

The washer ozone generator needle valve 58 is used to restrict the flow of oxygen and/or ozone gas through the washer ozone generator 42 in order to obtain a minimum pressure within the corona discharge ozone cell 44. The valve is used in conjunction with the oxygen pressure gauge 50 to set the gas pressure.

Washer Ozone Generator Check Valve 60

The washer ozone generator check valve 60 is used on the washer ozone generator ozone line 62 to prevent any water from backing up along the line 62 from the one or more of the washing units or machines 22. Water can be very harmful to the components within the washer ozone generator 42.

Washer Oxygen Concentrator Oxygen Line 64

The washer oxygen concentrator oxygen line 64 allows for the flow of the concentrated oxygen from the washer oxygen concentrator 68 to the washer ozone generator 42.

Washer Oxygen Concentrator Flow Meter 66

The washer oxygen concentrator flow meter 66 is used to monitor the flow of concentrated oxygen from the washer oxygen concentrator 68 to ensure the washer oxygen concentrator 68 is working properly.

Washer Oxygen Concentrator 68

The washer oxygen concentrator 68 takes ambient air with 21% oxygen and concentrates the air stream to produce an outlet gas stream of 90-95% oxygen using a molecular sieve material. Under pressure, the molecular sieve material adsorbs nitrogen and moisture from the air stream, leaving oxygen to pass on through. When the molecular sieve material is de-pressurized, it releases the nitrogen and moisture back to the atmosphere and is then ready to perform oxygen concentration again when pressurized.

Washer System Control Relays 70

The washer system control relays allow for a signal from a washer cycle controller 72 of the one or more of the washing units or machines 22 to turn on or off the washer ozone generator 42 and the washer oxygen concentrator 68 when demanded by washer system 20.

The relays also allow a signal from the ozone alarm 1102 to be used to power or not the washer ozone generator 42 and the washer oxygen concentrator 68.

If the ozone level in the ambient work area of the washer system 20 and the recycle system 10 is at or above the setpoint of the ozone alarm 1102, then the washer ozone generator 42 and the washer oxygen concentrator 68 cannot be powered. If the ozone level is below the setpoint, then the washer ozone generator 42 and the washer oxygen concentrator 68 can be powered on demand from the washer system 20.

Washer System Control Power Supply 80

The washer system control power supply 80 provides power to operate the washer ozone generator 42 and the washer oxygen concentrator 68. This power source is independent of laundry wash water recycle system 10 and washer system 20.

Main Control System 100

Referring to FIG. 2, system 10 comprises the main control system 100 comprises a main control box enclosure 104 housing a power disconnect 106, a 1-Phase breaker 108, a 3-Phase breaker 110, programmable logic controller (PLC) 120 comprising recycle system control program 122, variable frequency drive (VFD) 170, human/machine interface (HMI) 160. A main control box power supply 102 is external to the enclosure 104 and provides both 3-phase and 1-phase power to the electrical components contained therein.

Main Control Box Enclosure 104

The main control box enclosure 104 allows for connection of the main control box power supply 102 to the electrical components within. The main control box enclosure 104 provides protection of the electrical components from dust and moisture, and provides a protective barrier between operating personnel and the electrical components. Typically the main control box enclosure 104 is NEMA 4× rated.

Main Control Box Power Supply 102

The main control box power supply 102 provides both 3-phase and 1-phase power to the electrical components contained within the main control box enclosure 104. The 3-phase power line and the 1-phase power line are dedicated power supplies for only the recycle system 10. The voltage and amperage for both power lines are sized to meet the demands of the recycle system 10.

The main control box power supply 102 connects to the power disconnect 106 within the main control box enclosure 104.

Power Disconnect 106

The power disconnect 106 connects the main control box power supply 102 to the 1-Phase breaker 108 and the 3-Phase breaker 110. The power disconnect 106 provides an external method of safely disconnecting all power to the electrical components within the main control box enclosure 104 without the need to open the main control box enclosure 104 for maintenance purposes.

1-Phase Breaker 108

The 1-Phase breaker 108 receives 1-phase power from the main control box power supply 102 through the power disconnect 106 and distributes this power to the PLC 120 and the relays 180.

The 1-Phase breaker 108 prevents electrical current spikes from damaging the 1-phase electrical components and is sized to handle the maximum amperage required by the 1-phase components. The programmable logic controller (PLC) 120 is powered with 1-phase power via the 1-Phase breaker 108.

3-Phase Breaker 110

The 3-Phase breaker 110 receives 3-phase power from the main control box power supply 102 through the power disconnect 106 and distributes this power to the VFD 170. The 3-Phase breaker 110 prevents electrical current spikes from damaging the 3-phase electrical components and will be sized to handle the maximum amperage required by the 3-phase components.

Programmable Logic Controller (PLC) 120

Figure 4:
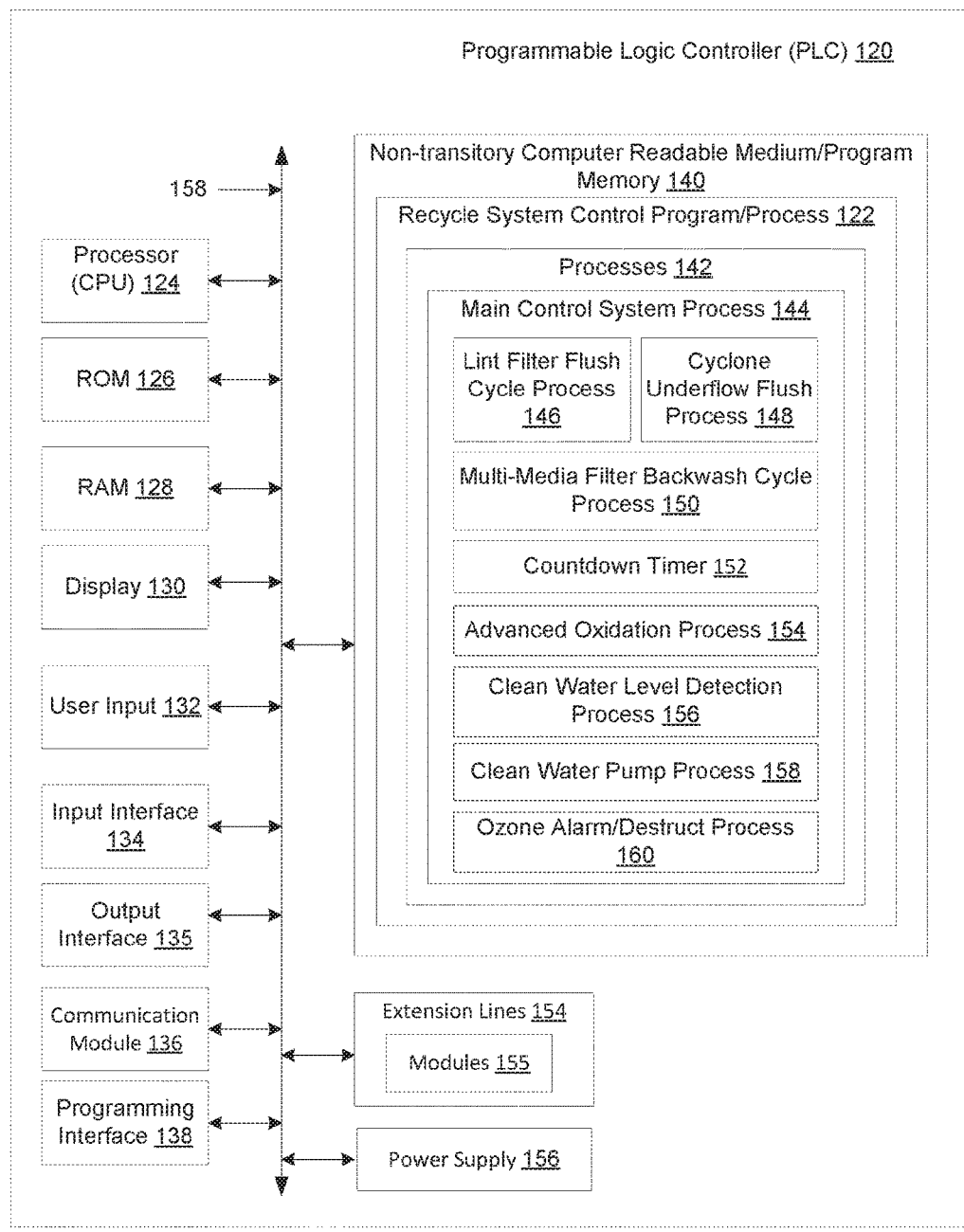
FIG. 4 is a block diagram view of an embodiment of a programmable logic controller (PLC) of the laundry wash water recycle system.

Referring to FIG. 4, the programmable logic controller (PLC) 120 can take the form of a single module or multiple modules with or without extensions modules 155 in the form of, but not limited to, one or more SIEMENS brand programmable logic controllers with or without extension modules for providing additional inputs and outputs.

The programmable logic controller (PLC) 120 comprises a processor device or central processing unit (CPU) 124; a hardware read only memory device (ROM) 126; a hardware main memory device (RAM) 128; a user display 130, a user input device 132, an input interface 134, an output interface 135, and a communication interface device or module 136, a programming interface 138, a non-transitory computer-readable medium or memory 140 providing application/program storage for user logic or application program(s); extension lines 154, extension modules 155, power supply 156, and a system bus 158 which comprises one or more conductor or communication paths that permit communication among the devices of the PLC 120.

The CPU or processor device 124 reads converted input signals from the input interface 134, executes the user logic or application program(s) 122 stored in the non-transitory computer-readable medium or memory 140, and then writes the appropriate output signals to the output interface 135. In one embodiment, the application program 122 is written in a language called ladder logic.

In addition to executing the user logic or application program(s) 122, the CPU 124 performs a PLC scan process, said PLC scan process comprises the steps of: performing an input scan that detects the state of all input devices that are connected to the PLC 120; performing a program scan that executes the user created program logic or application program(s) 122, which is called a ladder logic program; and performing a output scan that energizes or de-energizes all output devices that are connected to the PLC 120. The PLC scan process further comprises the step of performing housekeeping by communicating with programming terminals (CPU transfers program and data between itself and the programming terminal), performing internal diagnostics, et cetera. These four steps are continually processed by CPU 124 in a loop.

The CPU 124 is controlled by operating system software. The operating system software is a group of supervisory programs that are loaded and stored permanently in a memory of the PLC by the PLC manufacturer.

Typically ROM 126 is used to store programs and data that should not be altered. For example, the operating system software of the PLC 120. ROM 126 is a nonvolatile memory device (memory that retains stored information even without power) that stores program information that allows the CPU 124 to interpret and act on the ladder logic program stored in the non-transitory computer-readable medium or memory 140.

RAM 128 is a volatile memory device: memory that does not retain stored information without power.

Non-transitory computer-readable medium or memory 140 stores, inter alia, software or application instructions embodying or utilized by any one or more of the methodologies or functions described herein.

These software or application instructions include executable code that may also reside, completely or at least partially, within the RAM 128 and/or within the CPU or processor device 124 during execution thereof by PLC device 120 wherein the RAM 128 and the processor device 124 also constitute non-transitory computer-readable media or memory.

In one embodiment, the non-transitory computer-readable medium 140 is in the form of, but not limited to, a non-volatile flash memory that stores coded application instructions embodying or utilized by any one or more of the processes or methods 142 described herein. Additionally, non-volatile flash memory may also be employed for ROM 126. Examples of non-volatile flash memory include, but are not limited to, Solid-State Drive (SSD) devices, electrically programmable read only memory (EPROM), electrically erasable programmable read only memory (EEPROM), et cetera. In other words, any suitable media that is not fleeting or devoid of any semblance of permanence during transmission, and/or any suitable tangible media.

Display device 130 and user input 132 allow user interaction with the PLC 120.

Input interfaces 134 can accept discrete or analog signals of various voltage and current levels.

Output interfaces 135 operate much the same as the input interfaces 134 with the exception that the output interfaces 135 are either sinking (supplying a ground) or sourcing (providing a voltage) discrete voltages or sourcing analog voltage or current.

The input and output interfaces 134, 135 are designed in this way to minimize or eliminate the need for any intermediate circuitry between the PLC and the process to be controlled.

Communication interface device or module 136 provides means for communicating with one or more computer or communication networks for receiving and transmitting data to and from external devices. For example, texting status messages from the system 10 to monitoring personnel.

Programming interface 138 is utilized to couple the PLC 120 with a personal computer via a direct-connection cable or over a network and download a ladder logic program from the personal computer and store it in the non-transitory computer-readable medium or memory 140 of the PLC 500.

Extensions lines 154 are utilized to extend the limited number of input/output lines of the PLC 120 by coupling certain additional extension modules 155 to the PLC 120 through extension lines 154. Each extension module 155 can contain extensions of both input and output lines. Also, extension modules 155 can have inputs and outputs of a different nature from those on the PLC 120.

The PLC 120 is a control device. It take information from inputs and makes decisions to energize or de-energize outputs. The decisions are made based on the statuses of inputs and outputs and the ladder logic program 122 that is being executed.

Accordingly, PLC 120 contains the recycle system control program 122 that provides the logic to control the various functions of system 10. The PLC 120 receives signals (inputs) from various components within the recycle system 10, and using the recycle system control program 122, provides signals (outputs) to various devices via the relays 180 to provide control of system 10.

In one embodiment, the following are the components providing input signals to the PLC 120 and the components receiving output signals from the PLC 120. Inputs: collection sump level switch 208; inlet water tank level switch 308; lint filter differential pressure switch 556; multi-media filter differential pressure switch 720; recycle water ozone generator 802; clean water tank level switch 916; clean water pump flow switch 1014; clean water pump pressure transducer 1016; ozone alarm unit 1102; variable frequency drive (VFD) 170; and human/machine interface (HMI) 160. Outputs: city water by-pass solenoid valve 34; collection sump pump motor 206; repressurization pump motor 404; lint filter outlet motorized ball valve 578, lint filter flush water inlet motorized ball valve 584; lint filter flush water outlet motorized ball valve 586; cyclone underflow motorized ball valve 614; multi-media filter backwash inlet motorized ball valve 722; recycle water ozone generator inlet oxygen pressure switch 808; recycle water ozone generator temperature switch 814; recycle water ozone generator ozone output Switch 818; recycle water ozone generator vacuum pressure switch 824; recycle water hydrogen peroxide pump motor 834; clean water tank fresh water fill solenoid valve 922; clean water pump motor 1004; variable frequency drive (VFD) 170; and human machine interface (HMI) 160.

Moreover, recycle system control program 122 can be customized for a particular installation and can be modified in the field using a PLC program chip, input from a connected computer, and/or the HMI 160. The logic of the recycle system control program 122 for the various systems of the washer system 20 and the recycle system 10 is shown in the flow charts illustrated in FIGS. 11-21.

Variable Frequency Drive (VFD) 170

Referring to FIG. 2, variable frequency frive (VFD) 170 is powered by 3-phase power through the 3-Phase breaker 110. The VFD 170 provides power to and control of the clean water pump motor 104. The VFD 170 will speed up or slow down the clean water pump motor 1004 based on output signals from the PLC 120 via the clean water pump pressure transducer 1016 to maintain a predefined user or default setpoint pressure on the clean water pump outlet line 1008. The VFD 170 also provides an input signal to the PLC 120 to verify it is operating. The use of VFD 170 by system 10 allows for a single pump, clean water pump 1002, to be used to meet various flow demands of the recycle system 10 instead of requiring multiple pumps to meet the various flow demands. The VFD 170 is sized to meet the amperage demand of the clean water pump motor 1004.

Human/Machine Interface (HMI) 160

The human/machine interface (HMI) 160 is powered by 1-phase power via the PLC 120 and is installed on the outer cover of the main control box enclosure 104 to allow operator monitoring and action without the need to open the main control box enclosure 104. The HMI 160 will receive output signals from the PLC 120 with recycle system control program 122 to show the condition of various components and functions within the recycle system 10. The HMI 160 will also allow the operator to input changes to the recycle system control program 122 via input signals to the PLC 120 using the touchscreen of the HMI 160.

Relays 180

The relays 180 provide 1-phase power to various electrical components of the recycle system 10. The relays 180 allow for on/off control of these electrical components based on the output signals from the PLC 120 based on the input signals to the PLC 120 and the logic of the recycle system control program 122.

Collection Sump System 200

Referring to FIGS. 1 and 2, an embodiment of the collection sump system 200 comprises the collection sump 202, the collection sump pump 204 disposed in the collection sump 202, the collection sump pump motor 206, the collection sump level switch 208, and the collection sump lint screen 210. The collection sump 202 connects to the sewer using the collection sump sewer line 212 to allow any excess water entering the sump 202 to flow to sewer. The collection sump 202 should be adequately sized to handle the total inflows of water into it without overflowing. Additionally, the collection sump system 200 comprises a collection sump pump water outlet line 214 in fluid communication with inlet water tank 302. Accordingly, the collection sump 202 is in fluid communication with the washer drain line 24 of the one or more washing machines 22 for receiving laundry wash water therefrom and, in turn, the sump pump 204 is in fluid communication between the collection sump 202 and the inlet water tank 302 for pumping laundry wash water from the collection sump 202 to the inlet water tank 302 under the orchestration of the control system 100.

Collection Sump 202

More specifically, the collection sump 202 allows for wastewater from the one or more washing machines 22 to gravity flow into it from the washer drain line 24. The collection sump 202 also collects the flow of underflow water from the cyclone system 600 using the cyclone underflow line 608 and the flush water discharged from the lint filter system 500 using a lint filter flush water outlet line 582.

Collection Sump Pump 204

The collection sump pump 204 is operatively coupled to and powered by collection sump pump motor 206. The collection sump pump 204 is sized to handle the wastewater flow from the one or more washing machines 22 without allowing the collection sump 202 to overflow and with enough pressure to enter the inlet water tank 302. The collection sump pump 204 shall be a non-clogging design, like a recessed impeller type of pump.

Collection Sump Pump Motor 206

The collection sump pump motor 206 powers the collection sump pump 204 and is sized to allow the collection sump pump 204 to pump water at the required design flow and pressure. The collection sump pump motor 206 receives its on/off signals from the programmable logic controller (PLC) 120 with recycle system control program 122 and through the relays 180.

Collection Sump Level Switch 208

The collection sump level switch 208 provides a signal for three distinct levels within the collection sump 202. These signals are sent to the programmable logic controller (PLC) 120 to provide inputs for the recycle system control program 122.

The first or Low Level position will cause the collection sump pump motor 206 to not be powered to prevent the collection sump pump 204 from running dry and the collection sump pump motor 206 from overheating.

The second or Hi Level position will allow the collection sump pump motor 206 to be powered and ensure that the collection sump pump 204 and the collection sump pump motor 206 can be operated without harm.

The third or Hi-Hi Level will also allow the collection sump pump motor 206 to be powered and also provide a high level signal to be displayed on the HMI 160. The Hi-Hi level should be positioned at a level between the top of the collection sump sewer line 212 and the top of the collection sump 202.

Collection Sump Lint Screen 210

The collection sump lint screen 210 is a removable and operator cleaned device that removes lint and large debris from the lint filter flush water outlet line 582 during the flush cycle of the lint filter system 500. The collection sump lint screen 210 sets in the collection sump 202 above the normal operating water level and water drained through the screen enters the collection sump 202. Any lint and debris filtered by the collection sump lint screen 210 must be manually removed from the screen after it has been removed from the collection sump 202. The collection sump lint screen 210 reduces the chances of plugging the collection sump pump 204, the collection sump pump water outlet line 214, and the collection sump sewer line 212 while recovering flush water that can be re-treated by the system 10.

Collection Sump Sewer Line 212

The collection sump sewer line 212 allows flow of any excess water in the collection sump 202 to the sewer. The collection sump sewer line 212 should be positioned above the normal operating water level within the collection sump 202 and be sized to prevent overflowing of the collection sump 202.

Collection Sump Pump Water Outlet Line 214

The collection sump pump water outlet line 214 allows flow of wastewater from the collection sump pump 204 to the inlet water tank 302. The collection sump pump water outlet line 214 should be sized for the maximum output of the collection sump pump 204 with minimal line pressure loss.

Inlet Water Tank System 300

Referring to FIGS. 1 and 2, an embodiment of the laundry wash water recycle system 10 further comprises the inlet water tank system 300 comprising inlet water tank 302.

Inlet Water Tank 302

The inlet water tank 302 receives wastewater from the collection sump system 200 via the collection sump pump water outlet line 214 connected to an inlet water tank inlet line 304. The inlet water tank 302 is a reservoir for the repressurization pump system 400 to transfer wastewater for treatment via an inlet water tank outlet line 306 and a repressurization pump inlet line 406.

The inlet water tank 302 comprises an inlet water tank level switch 308 that provides signals to the programmable logic controller (PLC) 120 to control the operation of the collection sump pump motor 206 and the repressurization pump motor 404.

Additionally, the inlet water tank 302 receives treated water from the clean water pump system 1000 via an inlet water tank recirculation water inlet line 310 so that water is constantly moving through the system 10 and being treated.

Any off-gassing from the inlet water tank 302 flows to the ozone destruct unit 1104 via an inlet water tank vent line 312. Any excess water in the inlet water tank 302 flows back to the collection sump 202 via an inlet water tank overflow line 314 to prevent flooding of the tank 302. The inlet water tank 302 also has a manual drain for maintenance purposes using an inlet water tank drain valve 316 and a tank drain line 318.

Inlet Water Tank Inlet Line 304

The inlet water tank inlet line 304 allows flow of wastewater between the collection sump pump water outlet line 214 and the inlet water tank 302. The inlet water tank inlet line 304 will elbow down after entering the inlet water tank 302 and terminate at approximately two feet above the tank floor to minimize foaming within the inlet water tank 302. The inlet water tank inlet line 304 will be sized to minimize any line flow and pressure losses from the collection sump pump 204.

Inlet Water Tank Outlet Line 306

The inlet water tank outlet line 306 allows flow of wastewater from the inlet water tank 302 to the repressurization pump inlet line 406. The inlet water tank outlet line 306 shall be positioned two feet above the bottom of the inlet water tank 302 and terminate in an elbow downward to minimize float material and settled solids migration from the inlet water tank 302. The inlet water tank outlet line 306 will be sized to provide the maximum flow required by the repressurization pump 402.

Inlet Water Tank Level Switch 308

The inlet water tank level switch 308 provides a signal for three distinct levels within the inlet water tank 302: a Low Level Position, a Hi Level position, and a Hi-Hi Level position. These signals are sent to the programmable logic controller (PLC) 120 to provide inputs for the recycle system control program 122.

In one embodiment, the Low Level position will cause the repressurization pump motor 404 to not be powered to prevent the repressurization pump 402 from running dry and the repressurization pump motor 404 from overheating. The Low Level will be positioned at a level just above the inlet water tank outlet line 306.

The Hi Level position will allow the repressurization pump motor 404 to be powered and ensure that the repressurization pump 402 and the repressurization pump motor 404 can be operated without harm.

The Hi-Hi Level will also allow the repressurization pump motor 404 to be powered and also provide a high level signal to be displayed on the HMI 160. The Hi Hi level will be positioned at a level equal to the invert of the inlet water tank overflow line 314.

Inlet Water Tank Recirculation Water Inlet Line 310

The inlet water tank recirculation water inlet line 310 allows flow of treated water from the clean water pump system 1000 to the inlet water tank 302. The inlet water tank recirculation water inlet line 310 will elbow downward after entering the inlet water tank 302 and terminate two feet above the tank bottom to minimize foaming within the inlet water tank 302.

As detailed below, an inlet water tank recirculation throttling valve 320 and an inlet water tank recirculation flow meter 322 are operatively coupled to the inlet line 310 to manually adjust the recirculation flow rate. The inlet water tank recirculation water inlet line 310 will be sized for the maximum recirculation water flow rate.

Inlet Water Tank Vent Line 312

The inlet water tank vent line 312 allows flow of any off-gassing from the inlet water tank 302 to the ozone destruct unit 1104. The inlet water tank vent line 312 will be positioned at the highest possible point of the inlet water tank 302 and be sized to allow the maximum flow of off-gassing.

Inlet Water Tank Overflow Line 314

The inlet water tank overflow line 314 allows for any excess water in the inlet water tank 302 to flow back to the collection sump 202 to prevent flooding of the inlet water tank 302. The inlet water tank overflow line 314 will be sized to allow for the maximum wastewater flow coming into the inlet water tank 302 from the collection sump system 200 and the recirculation water from the clean water pump system 1000 to gravity flow to the collection sump 202.

Inlet Water Tank Drain Valve 316

The inlet water tank drain valve 316 is connected to the inlet water tank drain line 318 and is a manual operated valve to allow draining of the inlet water tank 302 for maintenance and/or removing solids from the tank bottom. The inlet water tank drain valve 316 is normally in the closed position.

Inlet Water Tank Drain Line 318

The inlet water tank drain line 318 allows wastewater flow from the inlet water tank 302 for maintenance purposes and/or to remove any settled solids from the bottom of the tank. The outlet of the inlet water tank drain line 318 can be connected by the operator to a convenient location for the drain water. As noted above, the inlet water tank drain valve 316 is connected to the inlet water tank drain line 318 to provide manual operation of the draining function. The inlet water tank drain line 318 is sized to allow the inlet water tank 302 to be drained within fifteen minutes and not plug with solids.

Inlet Water Tank Recirculation Throttling Valve 320

The inlet water tank recirculation throttling valve 320 is connected on the inlet water tank recirculation water inlet line 310 and is used to adjust the amount of recirculation water from the clean water pump system 1000 into the inlet water tank 302. By throttling the inlet water tank recirculation throttling valve 320 and visually checking the inlet water tank recirculation flow meter 322, the recirculation water flow rate is set.

Inlet Water Tank Recirculation Flow Meter 322

As noted, the inlet water tank recirculation flow meter 322 is connected on the inlet water tank recirculation water inlet line 310 and is used to visually adjust and set the recirculation water flow rate from the clean water pump system 1000 into the inlet water tank 302 in conjunction with the inlet water tank recirculation throttling valve 320.

Repressurization Pump System 400

Still referring to FIGS. 1 and 2, an embodiment of the laundry wash water recycle system 10 further comprises the repressurization pump system 400 comprising repressurization pump 402.

Repressurization Pump 402

Repressurization pump 402 transfers water from the inlet water tank 302 to the lint filter system 500 via the repressurization pump inlet line 406 and the repressurization pump outlet line 408. The repressurization pump 402 is powered by the repressurization pump motor 400. The repressurization pump 402 is sized to transfer wastewater at the design flow rate of the lint filter system 500, the cyclone system 600, and the multi-media filter system 700, and at a pressure to provide the design flow rate into the clean water tank 902. The repressurization pump 402 shall be a non-clogging design, like a recessed impeller type of pump.

Repressurization Pump Motor 404

The repressurization pump motor 404 powers the repressurization pump 402 and is sized to allow the repressurization pump 402 to pump water at the required design flow and pressure. The repressurization pump motor 404 receives its on/off signals from the programmable logic controller (PLC) 120 with recycle system control program 122 and through the Relays 180.

Repressurization Pump Inlet Line 406

The repressurization pump inlet line 406 allows flow of wastewater from the inlet water tank output line 306 to the repressurization pump 402. The repressurization pump inlet line 406 will be sized to allow for the design flow and pressure to be met by the repressurization pump 402.

Repressurization Pump Outlet Line 408

The repressurization pump outlet line 408 allows flow of wastewater from the repressurization pump 402 to the lint filter inlet line 524. The repressurization pump outlet line 408 will be sized to allow for the design flow and pressure to be met by the repressurization pump 402.

Repressurization Pump Inlet Block Valve 410 and Outlet Block Valve 412

The repressurization pump inlet block valve 410 is connected on the repressurization pump inlet line 406 and is a manual operated valve for maintenance purposes. The repressurization pump inlet block valve 410 is normally in the open position. The repressurization pump outlet block valve 412 is connected on the repressurization pump outlet line 408 and is a manual operated valve for maintenance purposes. The repressurization pump outlet block valve 412 is normally in the open position.

Self-Cleaning Lint Filter System 500

Referring to FIGS. 1 and 2, an embodiment of the laundry wash water recycle system 10 further comprises the self-cleaning pressurized lint filter system 500 comprising self-cleaning pressurized lint filter device 502.

Housing 504

Figure 5:
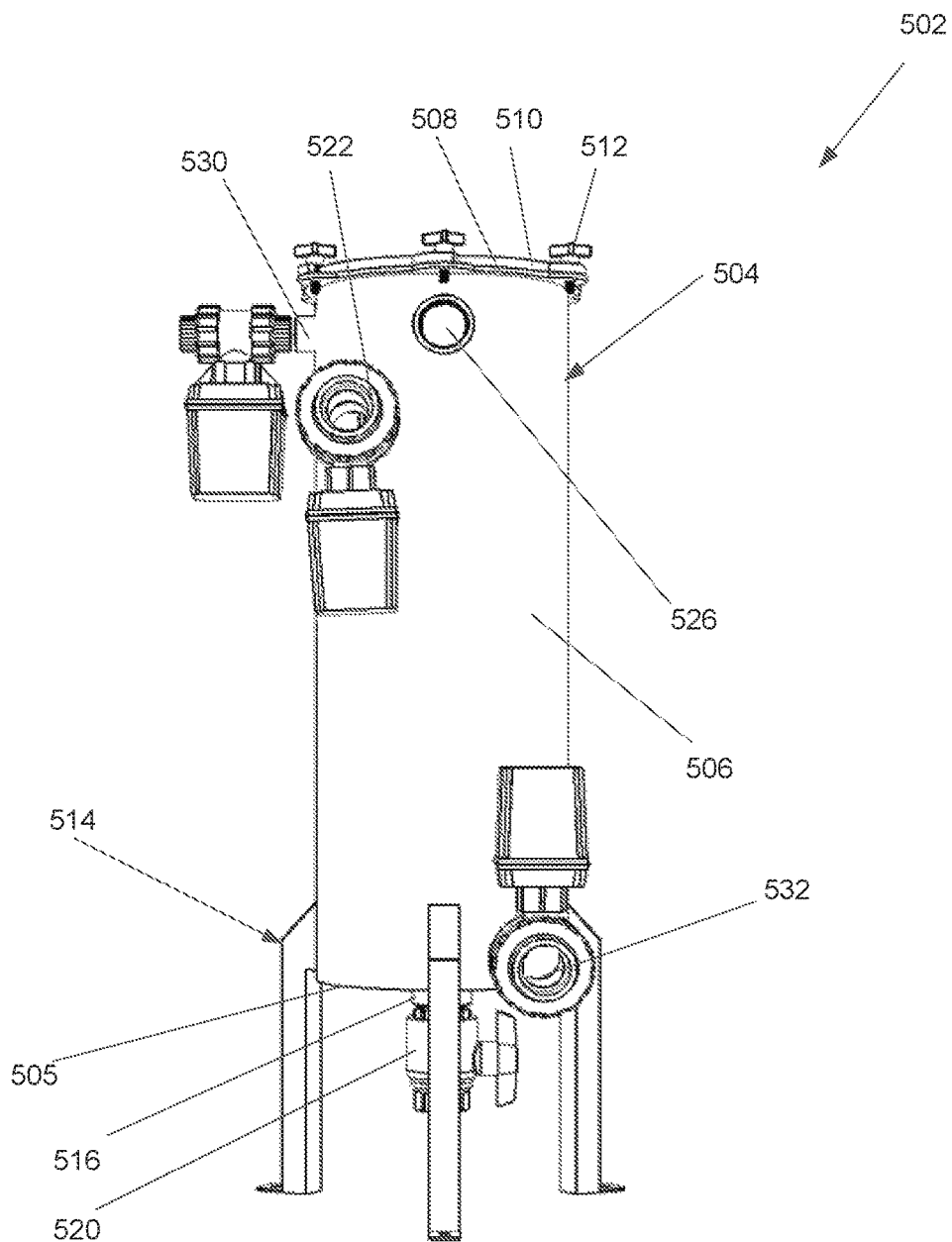
FIG. 5 is a perspective view of an embodiment of a self-cleaning lint filter device of the laundry wash water recycle system.

Referring to FIG. 5, an embodiment of the self-cleaning pressurized lint filter device 502 comprises a self-cleaning housing 504. The self-cleaning housing 504 comprises a closed bottom 505 having an outer circumscribing periphery transitioning into an upwardly extending circumscribing sidewall 506 terminating to an upper circumscribing lip 508 defining an upper opening of the housing 504 closed by a lid 510 mounting on the upper circumscribing lip 508 of the housing 504. The lid 510 is secured to upper circumscribing lip 508 of housing 504 with bolts 512. Additionally, self-cleaning housing 504 is mounted on legs 514 for support thereof.

Manual Lint Filter Drain Valve 520

Referring to FIGS. 1 and 5, the housing 504 comprises a centrally disposed drainage opening 516 in bottom 505 that is in selectively opened and closed communication with a drain line 518 that operatively feeds via manual lint filter drain valve 520 into line 582 that is in open communication with lint screen 210 disposed in sump 202. The lint filter drain line 518 allows for the lint filter 502 to be drained of any contained wastewater for maintenance purposes. The lint filter drain valve 520 is connected to the lint filter drain line 518 and is a manual operated valve to allow draining of the lint filter 502 for maintenance. The lint filter drain valve 528 is normally in the closed position. In one embodiment, the lint filter drain line 518 is sized to allow complete removal of wastewater from the lint filter 502 within five minutes or less.

Inlet and Outlet Channels or Passages 522, 524

The housing 504 also comprises an inlet channel or passage 522 operatively coupled to lint filter input line 524 that allows wastewater flow from the repressurization pump 402 via the repressurization pump outlet block valve 412 in the normally open position. The inlet line 524 is sized to allow the design flow of wastewater to enter the lint filter 502 with minimal pressure loss.

In turn, an outlet channel or passage 526 is operatively coupled to at least the one cyclone 602 via lint filter output line 528 that allows flow of filtered water from the lint filter 502 to the cyclone system 600 by connecting to at least the cyclone 602 via lint filter outlet motorized ball valve 578. The lint filter outlet line 528 is sized to allow the design flow of wastewater from the lint filter 502 to enter the cyclone system 600 with minimal pressure loss.

The lint filter outlet motorized ball valve 578 is connected to the lint filter outlet line 528 and is open during normal operation. When the flush cycle for the lint filter 502 is initiated, the programmable logic controller (PLC) 120 with the recycle system control program 122 signals through the relays 180 to close the lint filter outlet motorized ball valve 578 to prevent flush water entering the cyclone system 600.

Flush Water Inlet/Outlet Passages 530, 532—Motorized Ball Valves 584, 586

The housing 504 further comprises lint filter flush water inlet channel or passage 530 and lint filter flush water outlet channel or passage 532.

Inlet passage 530 is operatively coupled to lint filter flush water inlet line 580 that allows for the flow of treated water from the clean water pump system 1000 to enter the lint filter 502 for the flush cycle. A lint filter flush water inlet motorized ball valve 584 is connected to the lint filter flush water inlet line 580.

The lint filter flush water inlet motorized ball valve 584 is closed during normal operation. When the flush cycle process for the lint filter 502 is initiated, the programmable logic controller (PLC) 120 with the recycle system control program 122 signals through the relays 180 to open the lint filter flush water inlet motorized ball valve 584 for a predefined duration of the flush cycle. The lint filter flush water inlet line 580 is sized to ensure the flush water enters the lint filter 502 at the design flow rate and pressure for the sprays during the flush cycle.

In turn, outlet passage 532 is operatively coupled to the lint filter flush water outlet line 582 that allows for the flow of used flush water from the lint filter 502 to the lint screen 210 within the collection sump 202 during the flush cycle. A lint filter outlet motorized ball valve 586 is connected to the lint filter flush water outlet line 582. The lint filter outlet motorized ball valve 586 is closed during normal operation. When the flush cycle for the lint filter 502 is initiated, the programmable logic controller (PLC) 120 with the recycle system control program 122 signals through the relays 180 to open the lint filter outlet motorized ball valve 586.

The lint filter flush water outlet line 582 is sized to ensure that lint filter 502 will be drained and all the used flush water exits the lint filter 502 by gravity flow without plugging the line 582 with lint and solid debris during the flush cycle.

Lint filter Inlet Pressure Gauge 554 and Outlet Pressure Gauge 558

The self-cleaning pressurized lint filter system 500 further comprises a lint filter inlet pressure gauge 554 that is mounted on the lint filter inlet line 524 to provide a visual indication of the inlet pressure into the lint filter 502. Additionally, a lint filter outlet pressure gauge 558 provides a visual indication of the outlet pressure from the lint filter 502 and is mounted on the lint filter outlet line 528 coupling with line 604 via lint filter outlet motorized ball valve 578. The lint filter inlet pressure gauge 554 can be monitored to ensure that the repressurization pump 402 is operating correctly and that a lint filter differential pressure switch 556 is operating correctly when comparing the reading to the lint filter outlet pressure gauge 558.

Lint filter Differential Pressure Switch 556

The lint filter differential pressure switch 556 monitors the pressure on the lint filter inlet line 524 and on the lint filter outlet line 528 to determine if the differential meets or exceeds a predefined setpoint. When the differential pressure meets or exceeds the setpoint, the wedge-wire cylindrical screen filter 540 requires cleaning and the lint filter differential pressure switch 556 provides a signal to the PLC 120 with the recycle system control program 122 to initiate a flush cycle detailed below.

Wedge-Wire Cylindrical Screen Filter 540 & Circumscribing Gap 552

Figure 6:
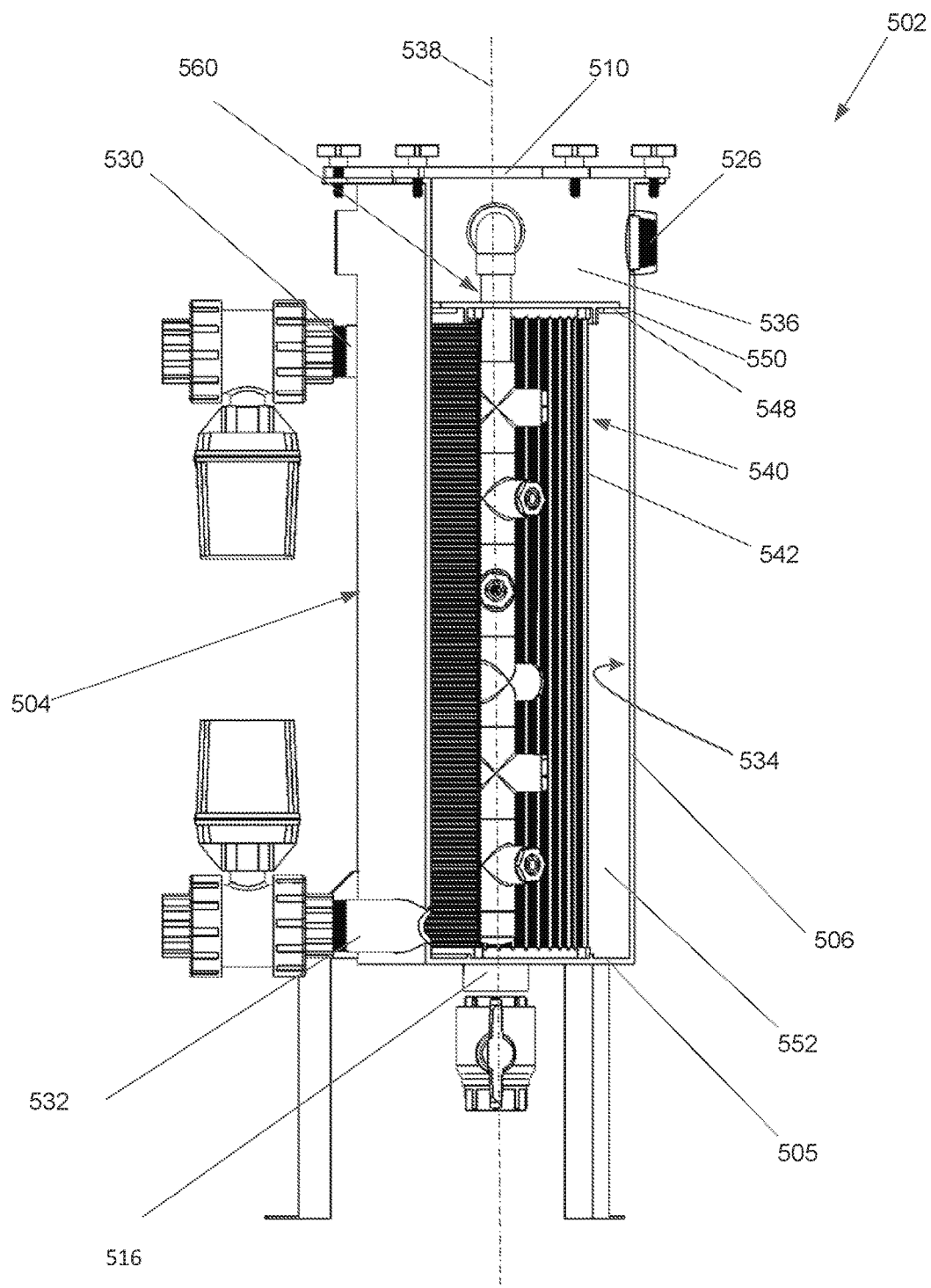
FIG. 6 is a partial sectional view of an embodiment of the self-cleaning lint filter device illustrating a perspective view of a housing enclosing a spray nozzle assembly, and a cylindrical wedge-wire screen device circumscribing the spray nozzle assembly, and a hollow cylindrical envelope or circumferential gap interposed between an exterior surface of the cylindrical wedge-wire screen device and an interior surface of the housing.

Referring now to FIGS. 5 and 6, the housing 504 of the self-cleaning pressurized lint filter device 502 comprises an upwardly extending circumscribing sidewall 506 having an interior circumscribing surface 534 defining a circumscribing main chamber 536 that extends along and circumscribes a central longitudinal axis 538 of the housing 504 and that is closed at one end by bottom 505 and at the opposing end by lid 510. Wedge-wire cylindrical screen filter 540 is configured to be received within the main chamber 536 of the housing 504 and to filter from out-to-in with a filter rating of, but not limited to, 25-100 microns.

Referring now to FIGS. 6 and 7, the wedge-wire cylindrical screen filter 540 comprises a wedge-wire cylindrical screen body 542 having a hollow interior 544, an inferior end 546, and a superior circumscribing collar end 548.

The inferior end 546 seals against the interior surface of the bottom 505 of the housing 504. In turn, the superior circumscribing collar end 548 radially outwardly extends from the hollow interior 544 of cylindrical screen body 542 and comprises a outer circumscribing edge seal 550 that is configured to seal against the interior circumscribing surface 534 of the upwardly extending circumscribing sidewall 506 of the housing 504 while circumferentially spacing the exterior circumferential surface of the cylindrical screen body 542 of the cylindrical screen filter 540 away from the interior circumscribing surface 534 of the upwardly extending circumscribing sidewall 506 of the housing 504 for forming a circumscribing gap 552 (FIG. 6) between the exterior circumferential surface of the cylindrical screen body 542 of the cylindrical screen filter 540 and the interior circumferential surface 534 of circumscribing sidewall 506 of the housing 504 wherein the circumscribing gap 552 is closed at opposing ends respectively by superior circumscribing collar end 548 of the cylindrical screen filter 540 and the interior surface of the inferior or bottom end 505 of the housing 504 thereby forming a hollow cylindrically shaped gap or envelope 552.

By having the wedge-wire cylindrical screen filter 540 disposed in the recirculation feedback of treated reclaim water results in less build-up of bio-growth on the screen filter 540. Less bio-growth on the screen filter 540 makes the cleaning of the screen filter 540 easier and more effective.

Spray Nozzle Assembly 560

Referring now to FIGS. 6 through 8, the self-cleaning pressurized lint filter device 502 further comprises spray nozzle assembly 560.

In particular, and referring to FIG. 8, the spray nozzle assembly 560 comprises a vertical blind bore conduit assembly 562 extending between a closed inferior end 564 and an open superior end 566. The vertical blind bore conduit assembly 562 supports, and is in fluid communication with, a plurality of pairs of opposing radially outwardly facing spray nozzles 568 that are vertically spaced apart and circumferentially distributed in a sequentially staggered pattern along a central axis of the vertical blind bore conduit assembly which, in one embodiment, is coincident with central axis 538 of housing 504. As illustrated in FIG. 7, an embodiment of the vertical blind bore conduit assembly 560 is formed of an elbow 570, extension 572, and six cross connectors 574 coupled end to end with each cross connector 574 comprising a pair of spray nozzles 568.

The spray nozzle assembly 560 comprising the plurality of pairs of spray nozzles 568 is disposed within the cylindrical screen filter 540 and is operatively coupled to and in open fluid communication with a lint filter flush water inlet line 580 which, in turn, is operatively coupled to and in open fluid communication with flush water inlet motorized ball valve 584 operatively coupled to the clean water pump 1002 via clean water pump outlet flush water block valve 1020 (FIG. 1).

Additionally, and as also illustrated in FIG. 8, the pair of spiral paths of spray nozzles 568 are sequentially staggered starting from the inferior pair of opposing spray nozzles and traversing the plurality of pairs of opposing spray nozzles along the pair of spiral paths to the superior pair of opposing spray nozzles wherein the pair of spiral paths of spray nozzles are shifted with respect to one another by one-hundred-eighty degrees. In other words, each successive pair of said plurality of pairs of opposing radially outwardly facing spray nozzles 568 is successively off-set 45 degrees so that one set of nozzles is off-set 45 degrees from its neighbor either above or below it.

The spiral paths of spray nozzles 568 are aligned on the inside of the cylindrical screen filter 540 to provide a pressurized water spray to clean the cylindrical screen filter 540 during the cleaning process of the self-cleaning pressurized lint filter device 502 detailed below.

Lint Filter Vent Valve 590

The lint filter vent valve 590 (FIG. 1) is connected to the lint filter vent line 592 and allows the lint filter 502 to be operated under pressure and still vent any trapped gas to the ozone destruct unit 1104 via the lint filter vent line 592.

The lint filter vent valve 590 will prevent water from the lint filter 502 flowing to the ozone destruct unit 1104 via the lint filter vent line 592. The lint filter vent line 592 will be positioned at the highest possible point of the lint filter 502 and is sized to allow the maximum flow of off-gassing.

Lint Filter Device 502 Use and Operation

Referring to FIGS. 1 through 8, and in use and operation, the lint filter device 502 receives wastewater from the repressurization pump system 400 via the fluid communication coupling of lint filter inlet line 524 with line 408 via valve 412, and removes lint and large solid debris by using the self-cleaning wedgewire cylindrical screen filter 540. The flow through wedgewire cylindrical screen filter 540 is outside to inside. Filtered water from the lint filter device 502 flows under pressure to the cyclone system 600 via the lint filter outlet line 528. The lint filter differential pressure switch 556 monitors the difference in pressure from the lint filter inlet line 524 and outlet line 528, and when the differential pressure meets or exceeds the predefined setpoint, a signal is provided to the PLC 120 with recycle system control program 122 to initiate the flush cycle to automatically clean the wedgewire cylindrical screen filter 540.

Flush water enters the lint filter 502 when the lint filter flush water inlet motorized ball valve 584 opens on the lint filter flush water inlet line 580. The flush water is evenly sprayed from the internal side of the wedgewire cylindrical screen filter 540 to the outside of the wedgewire cylindrical screen filter 540 to remove any accumulated lint and solid debris. Flush water with the accumulated lint and solid debris exits the lint filter 502 when the lint filter flush water outlet motorized ball valve 586 opens on the lint filter flush water outlet line 582. The dirty flush water flows to the lint screen 210 in the collection sump system 202.

Also, during the flush cycle, the lint filter outlet motorized ball valve 578 closes to prevent any dirt flush water migrating to the cyclone system 600.

The lint filter 502 has a manual operated drain using the lint filter drain valve 520 on the lint filter drain line 518 for maintenance purposes.

The lint filter 502 also has an off-gas venting line using the lint filter vent valve 590 on the lint filter vent line 592 that connects to the ozone destruct unit 1104.

Lint filter 502 is sized to meet the design flow rate of the repressurization pump 402. The lint filter 502 shall have at a minimum a design pressure to ensure that the wastewater will flow to the clean water tank 902 at the design flow rate and/or the maximum output pressure of the repressurization pump 402.

Cyclone System 600

Referring to FIGS. 1 and 2, an embodiment of the laundry wash water recycle system 10 further comprises the cyclone system 600 comprising cyclone 602.

Cyclone 602

Cyclone 602 uses centrifugal force to remove heavier than water solids down to the five micron range. The wastewater from the lint filter system 500 flows into the cyclone 602 via a cyclone inlet line 604. The treated water from the cyclone 602 flows to the multi-media filter system 700 via the cyclone outlet line 606. The solids removed by the cyclone 602 flow with a small percentage of the incoming wastewater via the cyclone underflow line 608 to the collection sump 202 to conserve water within the system 10. The cyclone 602 is sized to optimize solids removal down to the five micron range for the design flow rate of the repressurization pump 402.

Cyclone Inlet Line 604

Cyclone inlet line 604 allows wastewater flow from the lint filter system 500 into the cyclone 602. The cyclone inlet pressure gauge 610 is connected to the cyclone inlet line 604. The sizing of the cyclone inlet line 604 will allow for the maximum design flow into the cyclone 602 with minimal pressure drop.

Cyclone Outlet Line 606

Cyclone outlet line 606 allows treated water flow from the cyclone 602 to the multi-media filter System 700. Cyclone outlet check valve 612 is connected to the cyclone outlet line 606.

Sizing of the cyclone outlet line 606 will allow for the maximum design flow of the multi-media filter System 700 with minimal pressure drop.

Cyclone Underflow Line 608

Cyclone underflow line 608 allows flow of the separated solids from cyclone 602, plus a small percentage of the wastewater entering cyclone 602. Cyclone underflow line 608 drains to collection sump 202, which allows for settling of most of the separated solids and conserving water within the system 10. Cyclone underflow motorized ball valve 614 is connected to cyclone underflow line 608.

Sizing of cyclone underflow line 608 will allow for full flow of the underflow to the collection sump 202 with minimal pressure drop and chance of plugging with solids.

Cyclone Inlet Pressure Gauge 610

Cyclone inlet pressure gauge 610 allows for a visual indication of the incoming wastewater flow on the cyclone inlet line 604 from lint filter system 500 thereby allowing visual verification that flow and pressure into cyclone 602 is as required.

Cyclone Outlet Check Valve 612

Cyclone outlet check valve 612 is connected on cyclone outlet line 606 and prevents backwash water from multi-media filter system 700 to flow into cyclone system 600.

Cyclone Underflow Motorized Ball Valve 614

Referring to FIG. 1, the cyclone underflow motorized ball valve 614 is connected on the cyclone used on the underflow (separated solids) line 608 from the cyclone 602 to the sump 202 and is closed during normal operations.

Referring to FIG. 9, cyclone underflow motorized ball valve 614 comprises a ball valve 616 having pair of opposing, diametrically spaced apart central orifices 618, 620 respectively disposed through the closed faces of ball valve 616 of the underflow motorized ball valve assembly 614 to allow a set or controlled flow of solids laden water out of the cyclone 602 and through the ball valve 616, when the ball valve is closed and the cyclone operating, and through the underflow line 298 which empties into the collection sump 202. The amount of underflow water is determined by the sizing of the cyclone 602, and therefore determines the size of the diametrically spaced apart central orifices 618, 620. On a signal from the PLC 120 with recycle system control program 122 and via the relays 180, the cyclone underflow motorized ball valve 614 will open for a set period of time to allow a much higher underflow water flow to flush the cyclone and the cyclone underflow line 608 of any accumulated solids.

Multi-Media Filter System 700

Referring to FIGS. 1 and 2, an embodiment of the laundry wash water recycle system 10 further comprises the multi-media filter system 700 comprising multi-media filter 702.

Multi-Media Filter 702

Multi-media filter 702 provides final filtering of any solid particles, whether they are heavier or lighter than water, of the wastewater from the cyclone system 600. The multi-media filter 702 uses a combination of garnet, sand, and anthracite media and filters in a down flow manner. The three different media provide better solids holding capacity and better backwashing efficiencies than single media type filters.

The multi-media filter 702 utilizes a multi-media filter head assembly 730 that reverses the flow of the flow through the multi-media filter 702 to provide backwashing of the media when a signal is provided to the multi-media filter head assembly 730. This backwash signal is initiated by the multi-media filter differential pressure switch 720 through the PLC 120 with the recycle system control program 122 via the relays 180 when the differential pressure from the multi-media filter inlet line 704 and multi-media filter outlet line 706 meets or exceeds a predefined setpoint of the multi-media filter differential pressure switch 720 indicating that the media of the multi-media filter 702 needs cleaning.

Treated water from the clean water pump system 1000 is used as the backwash water, which assists in keeping the media clean of biological build-up with any remaining disinfectant residual from the recycle water advanced oxidation system 800.

During the backwash cycle process, the multi-media filter backwash inlet motorized ball valve 722 on the multi-media filter backwash inlet line 708 moves to an open position to allow the treated water from the clean water pump system 1000 to enter the multi-media filter head assembly 730 that directs the backwash water to the bottom of the multi-media filter 702. The backwash water fluidizes and cleans the media in an upflow manner, and the dirty backwash water exits the multi-media filter 702 through the multi-media filter head assembly 730 to the multi-media filter backwash outlet line 710 and directly to sewer. The duration of the backwash cycle is controlled using the multi-media filter head assembly 730 and the PLC 120 with recycle system control program 122.

Multi-Media Filter Inlet Line 704

Multi-media filter inlet line 704 allows wastewater flow from the cyclone system 600 into the multi-media filter 702 through the multi-media filter head assembly 730. The multi-media filter inlet ball valve 712 and the multi-media filter inlet pressure gauge 716 are connected to the multi-media filter inlet line 704. The sizing of the multi-media filter inlet line 704 will allow for the maximum design flow into the multi-media filter 702 with minimal pressure drop.

Multi-Media Filter Outlet Line 706

Multi-media filter outlet line 706 allows treated water flow from the multi-media filter 702 through the multi-media filter head assembly 730 to the recycle water advanced oxidation system 800. Multi-media filter outlet ball valve 714 and the multi-media filter outlet pressure gauge 718 are connected to the multi-media filter outlet line 706. Sizing of the multi-media filter outlet line 706 will allow for the maximum design flow into the recycle water advanced oxidation system 800 with minimal pressure drop.

Multi-Media Filter Backwash Inlet Line 708

The multi-media filter backwash inlet line 708 allows for flow of treated water from the clean water pump system 1000 to the multi-media filter 702 through the multi-media filter head assembly 730 for the backwash cycle. The multi-media filter backwash inlet motorized ball valve 722, the multi-media filter backwash inlet ball valve 724, the multi-media filter backwash inlet flow meter 726, and the multi-media filter backwash inlet check valve 728 are all connected to the multi-media filter inlet line 704. Sizing of the multi-media filter backwash inlet line 708 will allow for the maximum design flow and pressure of treated water for the backwash cycle required by the multi-media filter 702.

Multi-Media Filter Backwash Outlet Line 710

The multi-media filter backwash outlet line 710 allows flow of dirt-laden backwash water from the multi-media filter 702 through the multi-media filter head assembly 730 to the sewer for disposal. Sizing of the multi-media filter backwash outlet line 710 will allow for the maximum design flow of backwash water into the sewer with minimal pressure drop.

Multi-Media Filter Inlet Ball Valve 712

The multi-media filter inlet ball valve 712 is connected to the multi-media filter inlet line 704 and is manually operated for maintenance purposes of the multi-media filter 702. In normal operation, multi-media filter inlet ball valve 712 is in the open position.

Multi-Media Filter Outlet Ball Valve 714

Multi-media filter outlet ball valve 714 is connected to the multi-media filter outlet line 706 and is manually operated for maintenance purposes of the multi-media filter 702. In normal operation, the multi-media filter outlet ball valve 714 is in the open position.

Multi-Media Filter Inlet Pressure Gauge 716 and Outlet Pressure Gauge 718

Multi-media filter inlet pressure gauge 716 provides a visual indication of the inlet pressure into the multi-media filter 702 and is mounted on the multi-media filter inlet line

704. The multi-media filter inlet pressure gauge 716 can be monitored to ensure the repressurization pump 402 is operating correctly and that the multi-media filter differential pressure Switch 720 is operating correctly when comparing the reading to the multi-media filter inlet pressure gauge 716.

Multi-media filter outlet pressure gauge 718 provides a visual indication of the outlet pressure from the multi-media filter 702 and is mounted on the multi-media filter outlet line 706. Multi-media filter outlet pressure gauge 718 can be monitored to ensure that the multi-media filter differential pressure switch 720 is operating correctly when comparing the reading to the multi-media filter inlet pressure gauge 716.

Multi-Media Filter Differential Pressure Switch 720

Multi-media filter differential pressure switch 720 monitors the pressure on the multi-media filter inlet line 704 and on the multi-media filter outlet line 706 to determine if the differential meets or exceeds the setpoint of the multi-media filter differential pressure switch 720. When the differential pressure meets or exceeds the setpoint, the media within the multi-media filter 702 requires cleaning and the multi-media filter differential pressure switch 720 provides a signal to the PLC 120 with the recycle system control program 122 through the relays 180 to the multi-media filter head assembly 730 to initiate the backwash cycle.

Multi-Media Filter Backwash Inlet Motorized Ball Valve 722

Multi-media filter backwash inlet motorized ball valve 722 is connected to the multi-media filter backwash inlet line 708 and is closed during normal operation. When the backwash cycle for the multi-media filter 702 is initiated, the PLC 120 with the recycle system control program 122 signals through the relays 180 to open the multi-media filter backwash inlet motorized ball valve 722 for the set duration of the backwash cycle.

Multi-Media Filter Backwash Inlet Ball Valve 724 and Inlet Flow Meter 726

Multi-media filter backwash inlet ball valve 724 is connected on the multi-multi-media filter backwash inlet line 708 and is used to adjust the amount of backwash water from the clean water pump system 1000 into the multi-media filter 702 during the backwash cycle. By throttling the multi-media filter backwash inlet ball valve 724 and visually checking the multi-media filter backwash inlet flow meter 726, the backwash water flow rate can be set.

Multi-media filter backwash inlet flow meter 726 is connected on the multi-media filter backwash inlet line 708 and is used to visually adjust and set the backwash water flow rate from the clean water pump system 1000 into the multi-media filter 702 in conjunction with the multi-media filter backwash inlet ball valve 724.

Multi-Media Filter Backwash Inlet Check Valve 728

Multi-media filter backwash inlet check valve 728 is connected on the multi-media filter backwash inlet line 708 and prevents filtered water from the cyclone system 600 to flow into the clean water pump system 1000.

Multi-Media Filter Head Assembly 730

Multi-media filter head assembly 730 attaches to multi-media filter 702 and allows connection of the multi-media filter inlet line 704, the multi-media filter outlet line 706, and the multi-media filter backwash outlet line 710 to the multi-media filter 702. The multi-media filter head assembly 730 contains internal valves that allow wastewater to flow from the multi-media filter 702 down through the media of the multi-media filter 702 to the multi-media filter head outlet line 706 during normal filtering operation and allow backwash water to flow from the multi-media filter inlet line 704 via the multi-media filter backwash inlet line 708 up through the media of the multi-media filter 702 to the multi-media filter backwash outlet line 710 during the backwash cycle. The multi-media filter head assembly 730 also contains an electronic controller that controls the internal valves, sets the backwash cycle duration, and receives signals from the PLC 120 with recycle system control program 122 using the relays 180 to initiate the backwash cycle.

Recycle Water Advanced Oxidation System 800

Figure 10:
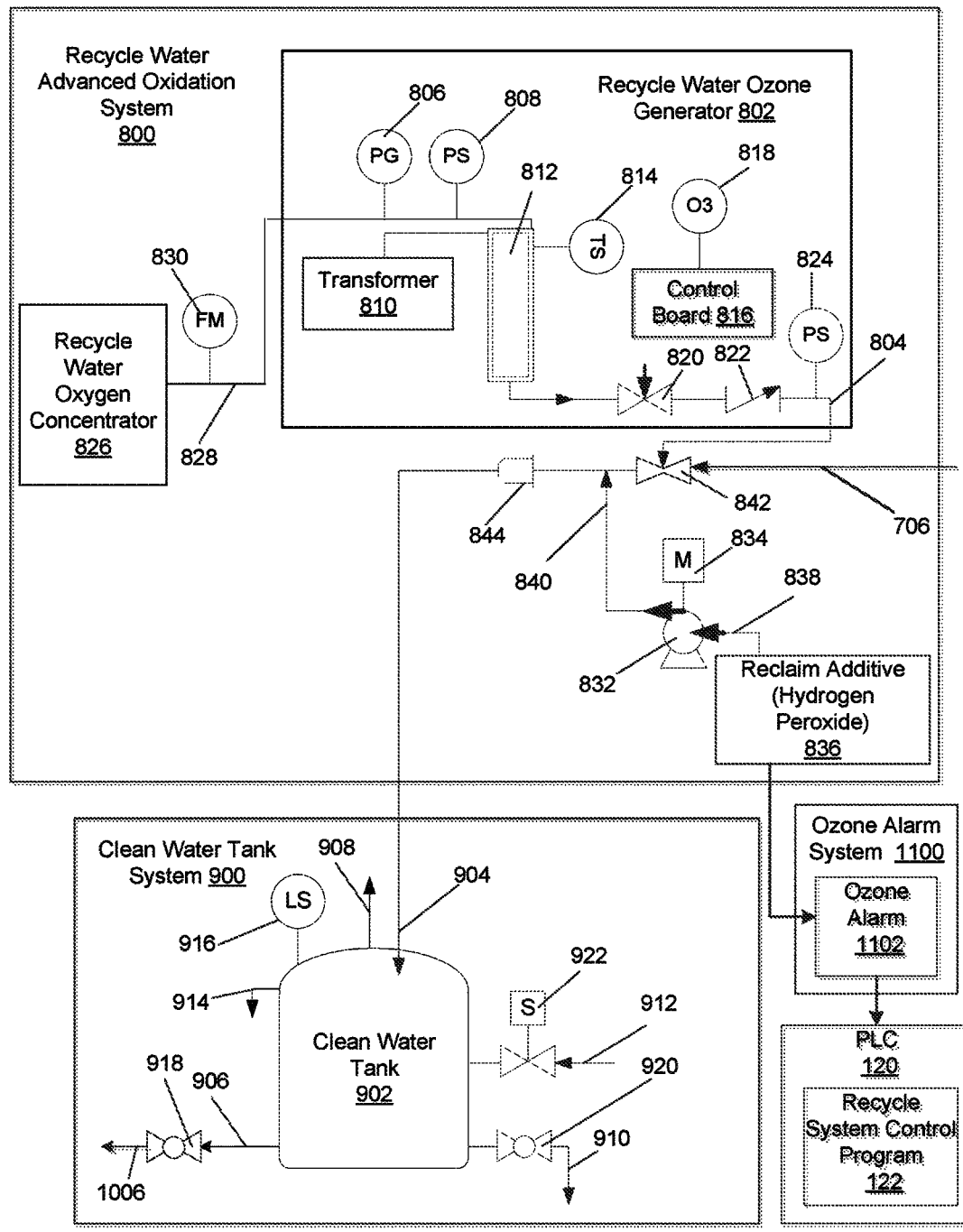
FIG. 10 is a process and instrumentation diagram view of an embodiment of a recycled water advanced oxidation system and a clean water tank system of the laundry wash water recycle system.

Referring to FIGS. 1 and 10, an embodiment of the laundry wash water recycle system 10 further comprises the recycle water advanced oxidation system 800 comprising recycle water ozone generator 802.

Recycle Water Ozone Generator 802

Recycle water ozone generator 802 is a corona discharge type ozone generator that produces high volumes and concentrations of ozone. The generator utilizes a recycle water ozone generator inlet oxygen pressure switch 808, a recycle water ozone generator temperature switch 814, a recycle water ozone generator ozone output switch 818, and a recycle water ozone generator vacuum pressure switch 824 to optimize the operation of and to protect the recycle water ozone generator control board 816, the recycle water ozone generator transformer 810, and the recycle water ozone generator corona ozone cell 812.

The on/off operation of the recycle water ozone generator 802 is controlled by a signal from the PLC 120 with recycle system control program 122 via relays 180 and the ozone alarm 1102.

Recycle Water Ozone Generator Ozone Line 804

The recycle water ozone generator ozone line 804 allows flow of the concentrated ozone/oxygen gas produced by the recycle water ozone generator 802 to flow into the recycle water ozone system venturi 842 on the multi-media filter outlet line 706 to mix the produced ozone with the wastewater from the multi-media filter 702 prior to flowing to the clean water tank system 900. The line must be made of a material that is ozone compatible and sized to allow the full flow from the recycle water ozone generator 802.

Recycle Water Ozone Generator Inlet Oxygen Pressure Gauge 806

Recycle water ozone generator inlet oxygen pressure gauge 806 provides a visual reference of the pressure of oxygen entering the recycle water ozone generator 802 from the recycle water oxygen concentrator 826. The pressure can be manually adjusted and set using the recycle water ozone generator needle valve 820 and seen using the recycle water ozone generator inlet oxygen pressure gauge 806.

Recycle Water Ozone Generator Inlet Oxygen Pressure Switch 808

Recycle water ozone generator inlet oxygen pressure switch 808 monitors the pressure of the oxygen entering the recycle water ozone generator 802 from the recycle water oxygen concentrator 826. If the pressure is below the setpoint of the switch indicating low flow or a leak of oxygen from the recycle water oxygen concentrator 826, then the switch will provide a signal to the PLC 120 (FIG. 2) with recycle system control program 122 via relays 180 to stop the production of ozone so as not to harm any of the components within the recycle water ozone generator 802. If the pressure is at or above the setpoint, then ozone production can continue as normal.

Recycle Water Ozone Generator Transformer 810 and Corona Ozone Cell 812

Recycle water ozone generator transformer 810 takes the incoming power and transforms it into a very high voltage/low amperage power source for the recycle water ozone generator corona ozone cell 812. The use of high voltage produces arcing within the recycle water ozone generator ozone cell 812 that produces high volumes and concentrations of ozone gas when a highly concentrated stream of oxygen is passed within the cell.

The recycle water ozone generator corona ozone cell 812 is a dielectric chamber that produces a high energy, electric arc when subjected to high voltage. This high energy arc or field will cause oxygen molecules (O2) to split into individual oxygen atoms when they flow though the field. Some of these oxygen atoms will combine with oxygen molecules and form ozone (O3).

Recycle Water Ozone Generator Temperature Switch 814

Recycle water ozone generator temperature switch 814 monitors the temperature of the recycle water ozone generator corona ozone cell 812 and the overall recycle water ozone generator 802 to protect the components of the recycle water ozone generator 802. If the temperature meets or exceeds a predefined setpoint, a signal from the switch to the PLC 120 with recycle system control program 122 via relays 180 will stop the production of ozone. When the temperature decreases below the setpoint, ozone production will continue as normal.

Recycle Water Ozone Generator Control Board 816

Recycle water ozone generator control Board 816 is used to control the production of ozone by monitoring the voltage from the recycle water ozone generator transformer 810 to the recycle water ozone generator corona ozone cell 812. A rheostat for the recycle water ozone generator control board 816 can be adjusted between 0-100% to vary the amount of ozone generated by adjusting the voltage from the recycle water ozone generator transformer 810 to the recycle water ozone generator corona ozone cell 812.

Recycle Water Ozone Generator Ozone Output Switch 818

Recycle water ozone generator ozone output switch 818 monitors the voltage from the recycle water ozone generator transformer 810 to the recycle water ozone generator corona ozone cell 812. If the voltage is out of a predefined range, then a signal is provided to the PLC 120 with recycle system control program 122 via relays 180 to stop the production of ozone for a preset time or until the recycle water ozone generator 802 power is cycled off and on to protect the components within the recycle water ozone generator 802. If the voltage is in range, then ozone production continues as normal.

Recycle Water Ozone Generator Needle Valve 820

Recycle water ozone generator needle valve 820 is used to restrict the flow of oxygen and/or ozone gas through the recycle water ozone generator 802 in order to obtain a minimum pressure within the recycle water ozone generator corona ozone cell 812. The valve 820 is used in conjunction with the recycle water ozone generator inlet oxygen pressure gauge 806 to set the gas pressure.

Recycle Water Ozone Generator Check Valve 822

Recycle water ozone generator check valve 822 is used on the recycle water ozone generator ozone line 804 to prevent any water from backing up along the line from the recycle water ozone system venturi 842 on the multi-media filter outlet line 706 thereby precluding the known harmful effects water can have on components within the recycle water ozone generator 802.

Recycle Water Ozone Generator Pressure Switch 824

Recycle water ozone generator vacuum pressure switch 824 monitors the pressure (vacuum) of the ozone leaving the recycle water ozone generator 802 to the recycle water ozone system venturi 842. If the pressure (vacuum) is below the setpoint of the switch indicating poor performance of the recycle water ozone system venturi 842 or a leak of ozone from the recycle water ozone generator 802, then the switch will provide a signal to the PLC 120 with recycle system control program 122 via relays 180 to stop the production of ozone so as not to harm any of the components within the recycle water ozone generator 802. If the pressure (vacuum) is at or above the setpoint, then ozone production can continue as normal.

Recycle Water Oxygen Concentrator 826

The recycle water oxygen concentrator 826 takes ambient air with 21% oxygen and concentrates the air stream to produce an outlet gas stream of 90-95% oxygen using a molecular sieve material. Under pressure, the molecular sieve material adsorbs nitrogen and moisture from the air stream, leaving oxygen to pass on through. When the molecular sieve material is de-pressurized, it releases the nitrogen and moisture back to the atmosphere and is then ready to perform oxygen concentration again when pressurized.

Recycle Water Oxygen Concentrator Oxygen Line 828

Recycle water oxygen concentrator oxygen line 828 allows for the flow of the concentrated oxygen from the recycle water oxygen concentrator 826 to the recycle water ozone generator 802.

Recycle Water Oxygen Concentrator Oxygen Flow Meter 830

Recycle water oxygen concentrator flow meter 830 is used to monitor the flow of concentrated oxygen from the recycle water oxygen concentrator 826 to ensure the oxygen concentrator 826 is working properly.

Recycle Water Hydrogen Peroxide Pump 832

Recycle water hydrogen peroxide pump 832 transfers recycle water hydrogen peroxide additive 836 into the double filtered cyclonically processed water flowing through multi-media filter outlet line 706 from the multi-media filter system 700. The recycle water hydrogen peroxide pump 832 is powered by a recycle water hydrogen peroxide pump motor 834 and can be manually set to deliver differing amounts of recycle water hydrogen peroxide additive 836.

The recycle water hydrogen peroxide pump 832 is compatible with the recycle water hydrogen peroxide additive 836, and is capable of providing the flow and pressure of recycle water hydrogen peroxide additive 836 required into the double filtered cyclonically processed water flowing through multi-media filter outlet line 706.

Recycle Water Hydrogen Peroxide Pump Motor 834

The recycle water hydrogen peroxide pump motor 834 powers the recycle water hydrogen peroxide pump 832, and is sized to provide the flow and pressure of recycle water hydrogen peroxide additive 836 required into the double filtered cyclonically processed water flowing through multi-media filter outlet line 706 using the recycle water recycle water hydrogen peroxide pump 832.

The recycle water hydrogen peroxide pump motor 834 receives its on/off signal from the PLC 120 with recycle system control program 122 via relays 180.

Recycle Water Hydrogen Peroxide Additive 836

Recycle water hydrogen peroxide additive 836 contains hydrogen peroxide in a concentration that is safe for handling and transport. The recycle water hydrogen peroxide additive 836 is added to the double filtered cyclonically processed water flowing through multi-media filter outlet line 706 using the recycle water hydrogen peroxide pump 832.

The hydrogen peroxide and ozone from the recycle water ozone generator 802 combine to make the hydroxyl radical, which is a very powerful oxidant that break downs organics and kills biological organisms within the wastewater. Any residual hydrogen peroxide will also break down organics and kill biological organisms within the wastewater, as it too is a strong oxidant.

The recycle water hydrogen peroxide additive 836 is typically shipped in chemical drums and must be replenished when the drum is empty.

Recycle Water Hydrogen Peroxide Pump Inlet Line 838

The recycle water hydrogen peroxide pump inlet line 838 allows the flow of the recycle water hydrogen peroxide additive 836 from the chemical drum containing the additive 836 to the recycle water hydrogen peroxide pump 832. The recycle water hydrogen peroxide pump inlet line 838 is sized to allow for the design flow and pressure to be met by the recycle water hydrogen peroxide pump 832.

Recycle Water Hydrogen Peroxide Pump Outlet Line 840

Recycle water hydrogen peroxide pump outlet line 840 allows flow of the recycle water hydrogen peroxide additive 836 from the recycle water hydrogen peroxide pump 832 into the multi-media filter outlet line 706. The recycle water hydrogen peroxide pump outlet line 840 is sized to allow for the design flow and pressure to be met by the recycle water hydrogen peroxide pump 832.

Recycle Water Ozone System Venturi 842

The recycle water ozone system venturi 842 is connected on the multi-media filter outlet line 706 and pulls ozone gas from the recycle water ozone generator 802 via the recycle water ozone generator ozone line 804 into the wastewater flow from the multi-media filter system 700. The recycle water ozone system venturi 842 creates a vacuum from the wastewater flowing through its nozzle design. The vacuum pulls the ozone gas into the double filtered cyclonically processed water. The recycle water ozone system venturi 842 is designed to draw the design total gas flow rate from the recycle water ozone generator 802, and must be made of materials compatible with ozone.

Recycle Water Ozone System Flash Mixer 844

Recycle water ozone system flash mixer 844 is connected on the multi-media filter outlet line 706 and mixes thoroughly any ozone gas, hydrogen peroxide, and wastewater. The mixing is accomplished with internal baffles creating turbulence. The thorough mixing of the ozone gas, hydrogen peroxide, and wastewater provides better inter-action between the ozone gas and hydrogen peroxide to produce more hydroxyl radicals, and better inter-action between the hydroxyl radicals, the residual ozone gas, and the residual hydrogen peroxide with the double filtered cyclonically processed water for more efficient organic and biological organism removal.

The recycle water ozone system flash mixer 844 also reduces the residence time needed for efficient organic and biological organism removal, which reduces the size of the clean water tank 902 and the overall footprint of the recycle system 10.

The recycle water ozone system flash mixer 844 will be compatible with ozone and hydrogen peroxide, and will be designed for the design of the wastewater flowing through the multi-media filter outlet line 706.

Clean Water Tank System 900

Referring to FIGS. 1 and 3, an embodiment of the laundry wash water recycle system 10 further comprises the clean water tank system 900 comprising the clean water tank 902.

Clean Water Tank 902

The clean water tank 902 receives the double filtered cyclonically processed advanced oxidation treated water from the recycle water advanced oxidation system 800 via the multi-media filter outlet line 706 and the clean water tank inlet line 904. Clean water tank 902 is a reservoir for the clean water pump system 1000 to transfer double filtered cyclonically processed advanced oxidation treated water via the clean water tank outlet line 906 and the clean water pump inlet line 1006.

The clean water tank 902 contains the clean water tank level switch 916 that provides signals to the PLC 120 to control the operation of the clean water pump motor 1004 and the repressurization pump motor 404.

The clean water tank 902 also provides double filtered cyclonically processed advanced oxidation treated water for recirculation purposes to the inlet water tank system 300 via the clean water pump system 1000 so that water is constantly moving through the system 10 and being treated.

Any off-gassing from the clean water tank 902 flows to the ozone destruct unit 1104 via the clean water tank inlet line 904.

Any excess water in the clean water tank 902 flows back to the collection sump 202 via the clean water tank overflow line 914 to prevent flooding of the tank. The clean water tank 902 also has a manual drain for maintenance purposes using a clean water tank drain valve 920 and the clean water tank drain line 910.

Clean Water Tank Inlet Line 904

Clean water tank inlet line 904 allows flow of double filtered cyclonically processed advanced oxidation treated water to the clean water tank 902 and elbows down after entering the clean water tank 902 and terminates at approximately two feet above the tank floor to minimize foaming within the clean water tank 902. The clean water tank inlet line 904 is sized to minimize any line flow and pressure losses from the multi-media filter system 700 and the recycle water advanced oxidation system 800.

Clean Water Tank Outlet Line 906

Clean water tank outlet line 906 allows flow of treated recycle water from the clean water tank 902 to the clean water pump inlet line 1006. The clean water pump outlet line 1008 shall be positioned two feet above the bottom of clean water tank 902 and terminate in an elbow downward to minimize float material migration from the clean water tank 902. The clean water tank outlet line 906 has the clean water tank outlet valve 918 connected to it for maintenance purposes. The clean water tank outlet line 906 is sized to provide the maximum flow required by the clean water pump 1002.

Clean Water Tank Vent Line 908

Clean water tank vent line 908 allows flow of any off-gassing from the clean water tank 902 to the ozone destruct unit 1104. The clean water tank vent line 908 will be positioned at the highest possible point of the clean water tank 902 and is to allow the maximum flow of off-gassing.

Clean Water Tank Drain Line 910

Clean water tank drain line 910 allows the double filtered cyclonically processed advanced oxidation treated water to flow from the clean water tank 902 for maintenance purposes and/or to remove any settled solids from the bottom of the tank. The outlet of the clean water tank drain line 910 can be connected by the operator to a convenient location for the drain water. The clean water tank drain valve 920 is connected to the clean water tank drain line 910 to provide manual operation of the draining function. The clean water tank drain line 910 will be sized to allow the clean water tank 902 to be drained within fifteen minutes and not plug with solids.

Clean Water Tank Fresh Water Inlet Line 912

Clean water tank fresh water inlet line 912 provides city or fresh water to the clean water tank 902. The clean water tank fresh water inlet line 912 connects to the clean water tank fresh water fill solenoid valve 922 that is controlled by the PLC 120 with recycle system control program 122 via the relays 180 as signaled by a clean water tank level switch 916. The line will be sized to allow the maximum make-up water needed by the clean water pump system 1000.

Clean Water Tank Overflow Line 914

Clean water tank overflow line 914 allows for any excess water in the clean water tank 902 to flow back to the collection sump 202 to prevent flooding of the clean water tank 902.

The clean water tank overflow line 914 is sized to allow for the maximum water flow coming into the clean water tank 902 from the multi-media system 700 to gravity flow to the collection sump 202.

Clean Water Tank Level Switch 916

The clean water tank level switch 916 provides a signal for four distinct levels within the clean water tank 902. These signals are sent to the PLC 120 to provide inputs for the recycle system control program 122. The Low-Low Level position will cause the clean water pump motor 1004 to not be powered to prevent the clean water pump 1002 from running dry and the clean water pump motor 1004 from overheating. The Low-Low Level will be positioned at a level just above the clean water tank outlet line 906. The Low and the Hi Level position will allow the clean water pump motor 1004 to be powered and ensure that the clean water pump 1002 and the clean water pump motor 1004 can be operated without harm. The Low-Low and the Low levels will also signal the PLC 120 with recycle system control program 122 to open clean water tank fresh water fill solenoid valve 922 via the relays 180 to allow fresh water into the clean water tank 902. The Hi-Hi Level will also allow the clean water pump motor 1004 to be powered and also provide a high level signal to be displayed on the HMI 160. The Hi-Hi level will be positioned at a level equal to the invert of the clean water tank overflow line 914.

Clean Water Tank Outlet Valve 918

Clean water tank outlet valve 918 is connected on the clean water tank outlet line 906 and is a manual operated valve for maintenance purposes. The clean water tank outlet valve 918 is normally in the open position.

Clean Water Tank Drain Valve 920

The clean water tank drain valve 920 is connected to the clean water tank drain line 910 and is a manual operated valve to allow draining of the clean water tank 902 for maintenance and/or removing solids from the tank bottom. The clean water tank drain valve 920 is normally in the closed position.

Clean Water Tank Fresh Water Fill Solenoid Valve 922

The clean water tank fresh water fill solenoid valve 922 allows fresh water to flow to the clean water tank 902 when opened and prevents fresh water to flow to the clean water tank 902 when closed. Control of the solenoid is done by a signal from the clean water tank level switch 916 to the PLC 120 with recycle system control program 122 via the relays 180. The valve is a normally closed valve and will not allow flow of fresh water in case the system 10 is inoperable.

Clean Water Pump System 1000

Referring to FIGS. 1 and 2, an embodiment of the laundry wash water recycle system 10 further comprises the clean water pump system 1000. The clean water pump system 1000 comprises clean water pump 1002, clean water pump motor 1004a clean water pump inlet line 1006, clean water pump outlet line 1008, washer treated water line 1010, second or multi-use treated water line 1012, clean water pump flow switch 1014, clean water pump pressure transducer 1016, clean water pump pressure gauge 1018, and clean water pump outlet flush water block valve 1020.

Clean Water Pump 1002

The clean water pump 1002 transfers water from the clean water tank 902 to the washer system 20 via the pump inlet line 1006 that connects to tank 902 and the pump outlet line 1008 that connects to the washer treated water line 1010. In turn, the pump outlet line 1008 also connects to the second or multi-use treated water line 1012 to provide, via clean water pump 1002, double filtered cyclonically processed advanced oxidation treated water defining recirculation water to the inlet water tank 302 via the inlet water tank recirculation water inlet line 310 in fluid communication with multi-use treated water line 1012. Furthermore, the clean water pump 1002 provides double filtered cyclonically processed advanced oxidation treated water defining flush water to the lint filter system 500 via the lint filter flush water inlet line 580 also in fluid communication with multi-use treated water line 1012. Moreover, the clean water pump 1002 provides double filtered cyclonically processed advanced oxidation treated water defining backwash water to the multi-media filter system 700 via the multi-media filter backwash inlet line 708 that is further connected in fluid communication with multi-use treated water line 1012.

The clean water pump 1002 is powered by the clean water pump motor 1004. The clean water pump 1002 is sized to transfer treated recycle water at the combined design flow rate and pressure required by the washer system 20 for its wash cycle, by the inlet water tank system 300 required for recirculation, by the lint filter system 500 required for the flush cycle, and the multi-media filter system 700. In one preferred form, but not limited thereto, the clean water pump 1002 is a centrifugal type of pump.

Clean Water Pump Motor 1004

Clean water pump motor 1004 powers the clean water pump 1002 and is sized to allow the clean water pump 1002 to pump water at the required design flow and pressure. The clean water pump motor 1004 will be powered by the VFD 170 to allow one pump to meet various flow demands at a constant pressure using the signal from the clean water pump pressure transducer 1016 through the PLC 120 with recycle system control program 122.

Clean Water Pump Inlet Line 1006 and Outlet Line 1008

Clean water pump inlet line 1006 allows flow of treated recycle water from the clean water tank outlet line 906 to the clean water pump 1002. Inlet line 1006 is sized to allow for the design flow and pressure to be met by the clean water pump 1002.

Clean water pump outlet line 1008 allows flow of the double filtered cyclonically processed advanced oxidation treated water or treated recycle water from the clean water pump 1002 to the first line, the washer treated water line 1010 and to the second line, the multi-use treated water line 1012. Outlet line 1008 will be sized to allow for the design flow and pressure to be met by the clean water pump 1002.

First or Washer Treated Water Line 1010

The first or washer treated water line 1010 allows flow of treated recycle water from the clean water pump 1002 via the clean water pump outlet line 1008 to the washer system 20. The first or washer treated water line 1010 is sized to allow for the design flow and pressure required by the washer system 20.

Second/Multi-Use Treated Water Line 1012

The second or multi-use treated water line 1012 connects to the clean water pump outlet line 1008 and allows flow of double filtered cyclonically processed advanced oxidation treated water required as first, the recirculation water to the inlet water tank system 300 via the inlet water tank recirculation water inlet line 310; second, as flush water to the lint filter system 500 via the lint filter flush water inlet line 508; and third, as backwash water to the multi-media filter system 700 via the multi-media filter backwash inlet line 708. The multi-use treated water line 1012 is sized to allow for the combined design flow and pressure required for recirculation to inlet water tank system 300, flushing the lint filter system 500, and the multi-media filter system 700.

Clean Water Pump Flow Switch 1014

The clean water pump flow switch 1014 connects to the clean water pump outlet line 1008 and monitors the flow rate through the clean water pump outlet line 1008. The clean water pump flow switch 1014 provides a signal to the PLC 120 with recycle system control program 122 to ensure the flow rate is within range to prevent harm to the clean water pump 1002, the clean water pump motor 1004, and the clean water pump outlet line 1008.

Clean Water Pump Pressure Transducer 1016

The clean water pump pressure transducer 1016 connects onto the clean water pump outlet line 1008 and monitors the pressure on the clean water pump outlet line 1008. The clean water pump pressure transducer 1016 provides an analog signal to PLC 120 with recycle system control program 122 and/or to the VFD 170 to allow the VFD 170 to increase or decrease the speed of the clean water pump motor 1004, which increases or decreases the output of the clean water pump 1002, to meet a set pressure on the clean water pump outlet line 1008. The clean water pump pressure transducer 1016 allows for the clean water pump 1002 to meet various flow demands automatically with only one pump.

Clean Water Pump Pressure Gauge 1018

The clean water pump pressure gauge 1018 will provide a visual indication of the outlet pressure from the clean water pump 1002 and is mounted on the clean water pump outlet line 1008. The clean water pump pressure gauge 1018 can be monitored to ensure that the clean water pump 1002 is operating correctly.

Clean Water Pump Outlet Flush Water Block Valve 1020

The clean water pump outlet flush water block valve 1020 is connected on multi-use treated water line 1012 and is a manual operated valve for maintenance purposes and is normally in the open position.

Ozone Alarm/Destruct System 1100

Referring to FIGS. 1 and 2, an embodiment of the laundry wash water recycle system 10 further comprises the ozone alarm/destruct system 1100 comprised of ozone alarm unit 1102, ozone destruct unit 1104, ozone destruct inlet line 1106, ozone destruct outlet line 1108, and ozone alarm/destruct power supply 1110.

Ozone Alarm Unit 1102

The ozone alarm unit 1102 monitors the atmosphere around the washer system 20 and laundry wash water recycle system 10 to ensure the ozone level in the area is not in a harmful range. The ozone alarm unit 1102 provides a signal to the washer system control relays 70 and to the relays 180 of the recycle system 10 if the ozone level is at or above the setpoint of the ozone alarm unit 1102. The signal prevents the washer ozone generator 42 and the recycle water ozone generator 802 from generating additional ozone until the ozone level in the atmosphere becomes less than the setpoint of the ozone alarm unit 1102. The ozone alarm unit 1102 is powered separately from the washer system 20 and the recycle system 10 by the ozone alarm/destruct power supply 1110.

Ozone Destruct Unit 1104

The ozone destruct unit 1104 receives off-gas from the inlet water tank system 300, the lint filter system 500, and the clean water tank system 900 to remove any ozone within the off-gas before being vented to atmosphere.

The ozone destruct unit 1104 uses a catalyst and heat to convert the ozone back to oxygen. The ozone destruct unit 1104 is designed to allow for the design flow and pressure of all the off-gas lines combined. The ozone destruct unit 1104 is powered separately from the washer system 20 and the recycle system 10 by the ozone alarm/destruct power supply 1110.

Ozone Destruct Inlet Line 1106

The ozone destruct inlet line 1106 allows flow of off-gas from the inlet water tank vent line 312, the lint filter vent line 592, and the clean water tank vent line 908 into the ozone destruct unit 1104. The ozone destruct inlet line 1106 is ozone compatible, and designed to allow for the design flow and pressure of all the vent lines combined.

Ozone Destruct Outlet Line 1108

The ozone destruct outlet line 1108 allows flow of treated off-gas from the ozone destruct unit 1104 to an outside vent. The ozone destruct outlet line 1108 is designed to allow for the design flow and pressure of all the vent lines combined.

Ozone Alarm/Destruct Power Supply 1110

The ozone alarm/destruct power supply 1110 provides power to the ozone alarm unit 1102 and the ozone destruct unit 1104, and is separate from the power supplies for the washer system 20 and the recycle system 10 to ensure that the ozone alarm unit 1102 and ozone destruct unit 1104 are constantly operating independent of the other systems. The ozone alarm/destruct power supply 1110 has its own separate breakers, and provides the required voltage and amperage to safely operate the ozone alarm unit 1102 and the ozone destruct unit 1104.

In Use and Operation

In use and operation, an embodiment of the laundry wash water recycle system 10 is utilized in collecting and treating laundry wash water from, but limited to, commercial (for example, hotel, hospital, nursing home, et cetera.) and industrial (for example, uniforms, professional laundry services, et cetera.) washing machines 22 so that it can be re-used effectively and safely by the washing machines 22.

As detailed hereinabove with reference to FIGS. 1 through 10, the recycle system 10 provides quality reclaim water for re-use within the washer system 20 while maintaining dependence therefrom by allowing the washer system 20 to operate independently of the recycle system 10 so as to create no disruption of wash operations in case of, inter alia, maintenance on system 10. In the case of maintenance, fresh water is provided to washer or washers 22 via the city water by-pass solenoid valve 34, and wastewater from the washer or washers 22 flows into the collection sump 202 and directly out to the sewer without being treated.

The main control system 100 allows for connection of the main control box power supply 102 and the components of the recycle system 10 to provide control of the recycle system 10.

Figure 11:
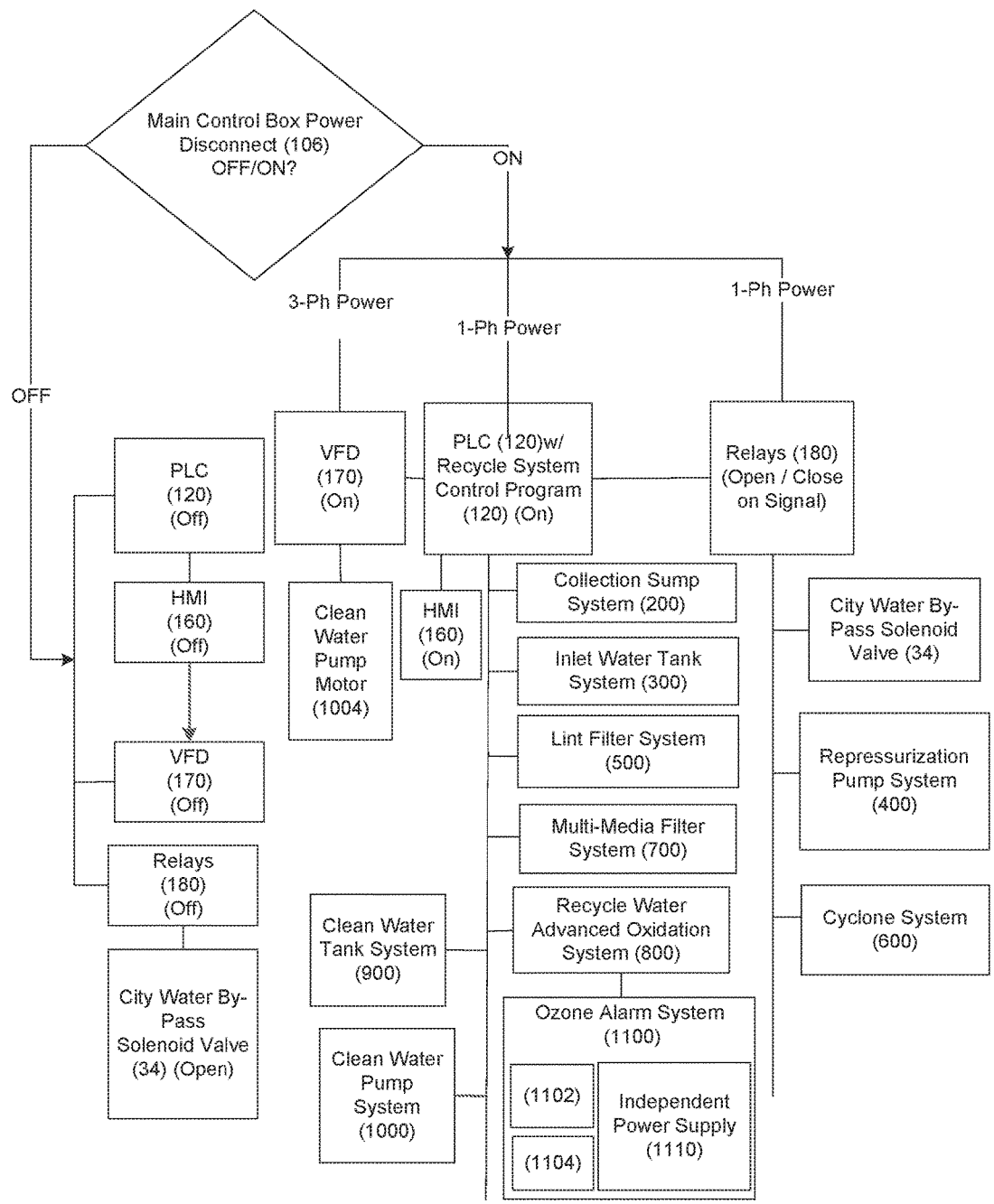
FIG. 11 is a flow diagram view of an embodiment of a main control box power control process of the recycle system control process of the laundry wash water recycle system.

Referring to FIGS. 4 and 11, and in one embodiment, the main control system process 144 comprises initially determining if the main control box power disconnect 106 is in the off or on position. If the main control box power disconnect 106 is in the off position, then the VFD 170 is not powered, the PLC 120 is not powered, the HMI 160 is not powered, the relays 180 are not powered, and the city water by-pass solenoid valve 34 is in the open position.

This operation allows for maintenance of the recycle system 10 and will allow for the washer 22 to continue to operate on fresh water in lieu of double filtered cyclonically processed advanced oxidation treated water. Wastewater from the washer 22 will not be treated and will be discharged to sewer.

In the alternative, if the main control box power disconnect 106 is in the on position, then the VFD 170 is powered, the PLC 120 with the recycle system control program 122 is powered, the HMI 160 is powered, and the relays 180 are powered. The city water by-pass solenoid valve 34, the collection sump system 200, the repressurization pump system 400, the lint filter system 500, the cyclone system 600, the multi-media filter system 700, the recycle water advanced oxidation system 800, the clean water tank system 900, and the clean water pump system 1000 are all powered and controlled as determined by the recycle system control program 122 residing within the PLC 120.

With the recycle system 10 operational, the recycle system 10 provides quality reclaim water and particularly double filtered cyclonically processed advanced oxidation treated water for re-use within the washer system 20.

As noted above, an embodiment of the recycle system 10 comprises the recycle system control or application program 122 comprised of coded instructions that are stored in the non-transitory computer readable medium or program memory 140 of the PLC 120. Accordingly, the non-transitory computer-readable medium or memory 140 stores, inter alia, the software or application instructions embodying or utilized by any one or more of the methodologies or functions described herein for providing the double filtered cyclonically processed advanced oxidation treated water for re-use within the washer system 20.

Figure 12:
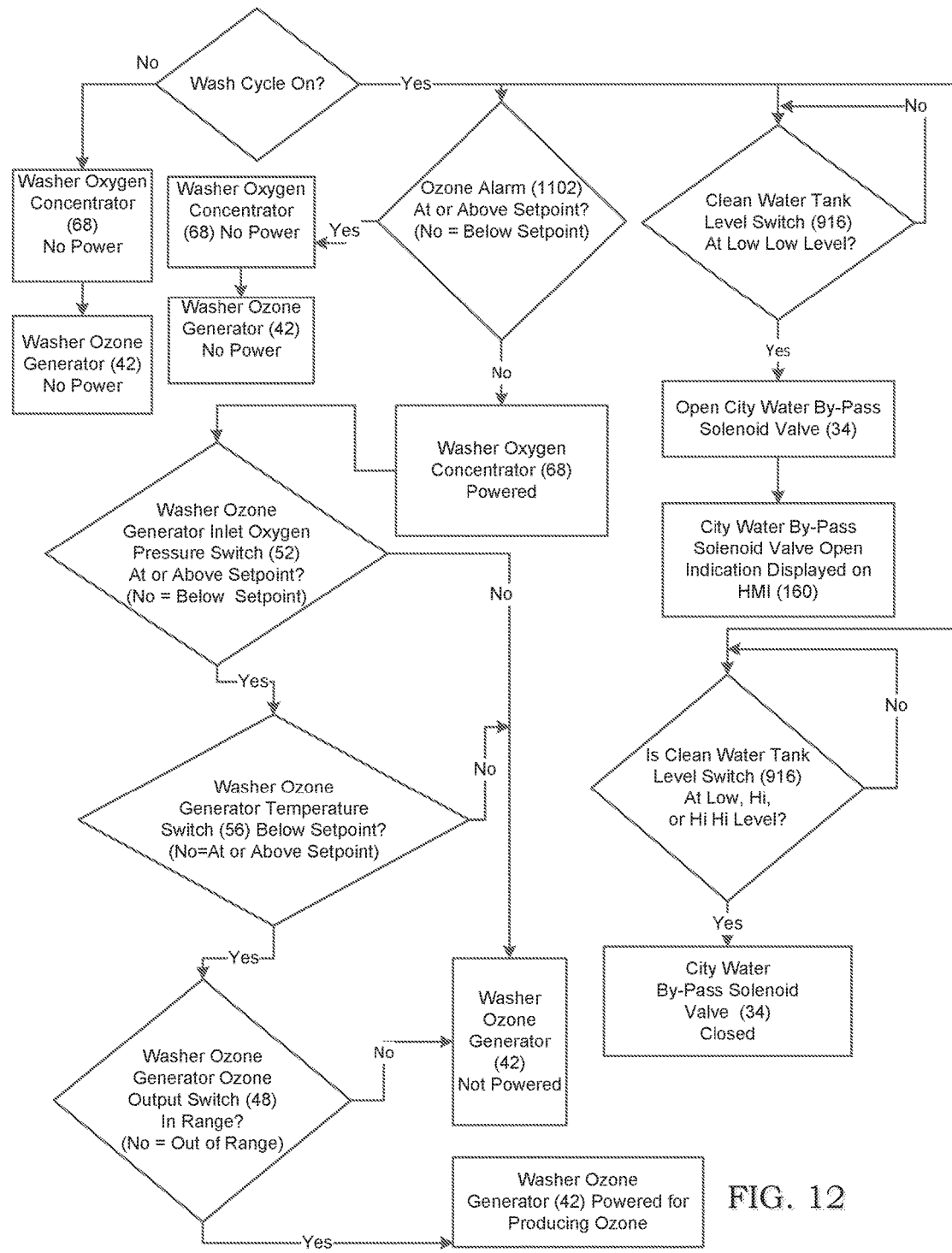
FIG. 12 is a flow diagram view of an embodiment of a washer control process of the recycle system control process of the laundry wash water recycle system.

Referring to FIG. 12, the main control system process 144 further comprises determining if the washer cycle is off or on is initiated by the operator(s) of the wash and a signal associated with this off or on state is provided by the washer cycle controller 72 (FIG. 4) to provide the correlative signal for operation of the washer oxygen concentrator 68 and washer ozone generator 42 via relays 70.

If the washer 22 is not operating (wash cycle off), neither the washer oxygen concentrator 68 nor the washer ozone generator 42 will be powered.

If the washer 22 is operating (wash cycle on), then at least two independent, yet concurrent, operation occur. One operation is determining if the ozone alarm unit 1102 is at or above the predefined setpoint or below the setpoint. The other concurrent operation being a continuous or loop monitoring determination of if the clean water tank level switch 916 is at a Low-Low Level.

Regarding the ozone alarm determining operation, if the ozone alarm unit 1102 detects ozone in the atmosphere within the area of the washer system 20 and/or recycle system 10 that is at a level at or above the setpoint, and the washer cycle is on, no power will be supplied to the washer oxygen concentrator 68 or the washer ozone generator 42. This operation is a safety measure to make sure ozone levels do not get to a harmful level in the working environment of the washer system 20 and/or the recycle system 10.

In contrast, if the ozone level in both the working environment of the washer system 20 and the recycle system 10 are below the setpoint of the ozone alarm unit 1102, both the washer oxygen concentrator 68 and washer ozone generator 42 will be powered when the washer cycle is on. Furthermore, the washer ozone generator 42 will not produce ozone if the washer ozone generator inlet oxygen pressure switch 52 is below its setpoint, and/or the washer ozone generator temperature switch 56 is at or above its setpoint, and/or the washer ozone generator output switch 48 is out of range. This function protects the components of the washer ozone generator 42. To again note, it is only if the washer ozone generator inlet oxygen pressure switch 52 is at or above its setpoint, and the washer ozone generator temperature switch 56 is below its setpoint, and the washer ozone generator output switch 48 is in range will the washer ozone generator 42 produce ozone.

Regarding the concurrent clean water tank level switch monitoring operation, if the clean water tank level switch 916 detects a Low-Low level in the clean water tank 902, then it is determined that there is not enough treated water in the recycle system 10 to provide to the washer 22. Therefore, the city water by-pass solenoid valve 34 will open to allow fresh water into the washer 22 when its cycle is on so as not to disrupt its operation. Also, an indication that the city water by-pass solenoid valve 34 is open will be displayed on the HMI 160 of the recycle system 10. This operation is independent to the operation of the washer oxygen concentrator 68 and the washer ozone generator 42 described above.

In contrast, if the clean water tank level switch 916 detects a Low, Hi, or Hi-Hi level in the clean water tank 902, then it is determined that there is enough treated water in the recycle system 10 to provide to the washer 22. Therefore, the city water by-pass solenoid valve 34 will remain closed and treated water from the recycle system 10 will be used by the washer 22 when its cycle is on. This operation is also independent to the operation of the washer oxygen concentrator 68 and the washer ozone generator 42 described above.

Referring to FIGS. 1 and 2, the collection sump system 200 receives wastewater from the washer 22 and transfers the wastewater to the inlet water tank 302. The collection sump system 200 also receives the underflow water from the cyclone system 600 and the flush water from the lint filter system 500 to be returned to and treated by the recycle system 10 to conserve water.

Figure 13:
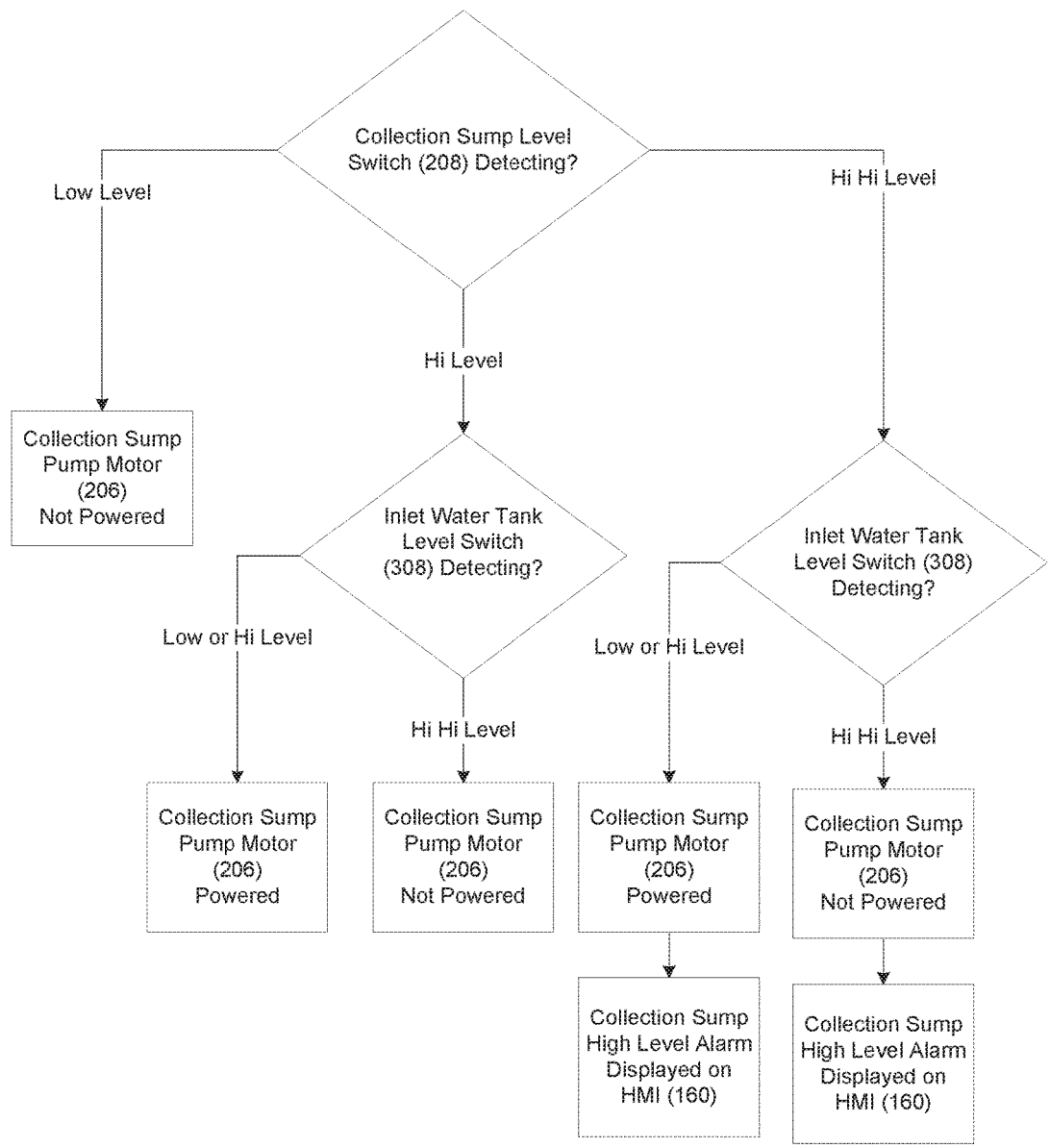
FIG. 13 is a flow diagram view of an embodiment of a collection sump control process of the recycle system control process of the laundry wash water recycle system.

Referring to FIG. 13, the main control system process 144 further comprises determining the collection sump level switch 208 detects or indicates a Low level, a Hi-Hi Level, or a Hi-Hi Level in the collection sump 202

If the collection sump level switch 208 detects or indicates a Low level in the collection sump 202, then the collection sump pump motor 206 will not powered. This operation protects the collection sump pump 204 from running dry and damaging itself and from over-heating the collection sump pump motor 206 thus damaging the motor 206.

If the collection sump level switch 208 indicates a Hi Level in the collection sump 202 and the inlet water tank level switch 308 indicates a Low or Hi Level in the inlet water tank 302, then the collection sump pump motor 206 will be powered and wastewater will flow between the collection sump 202 to the inlet water tank 302.

If the collection sump level switch 208 indicates a Hi Level in the collection sump 202 and the inlet water tank level switch 308 indicates a Hi-Hi Level in the inlet water tank 302, then the collection sump pump motor 206 will not be powered as there is too much water in the inlet water tank 302.

If the collection sump level switch 208 indicates a Hi-Hi Level in the collection sump 202 and the inlet water tank level switch 308 indicates a Low or Hi Level in the inlet water tank 302, then the collection sump pump motor 206 will be powered and wastewater will flow between the collection sump 202 to the inlet water tank 302. Also, a collection sump high level alarm will be indicated on the HMI 160 of the recycle system 10.

If the collection sump level switch 208 indicates a Hi-Hi Level in the collection sump 202 and the inlet water tank level switch 308 indicates a Hi-Hi Level in the inlet water tank 302, then the collection sump pump motor 206 will not be powered as there is too much water in the inlet water tank 302. Any excess wastewater will flow from the collection sump 202 directly to sewer via the collection sump 202. Also, a collection sump high level alarm will be indicated on the HMI 160 of the recycle system 10.

Referring to FIGS. 1 and 2, the inlet water tank system 300 receives wastewater from the collection sump system 200, and the repressurization pump system 400 transfers wastewater from the inlet water tank 302 to the lint filter system 500. The inlet water tank 302 also receives treated water from the clean water pump system 1000 to continuously recirculate water through the recycle system 10 to maintain the cleanliness of the recycle system 10 and to continuously treat the water within the recycle system 10.

Figure 14:
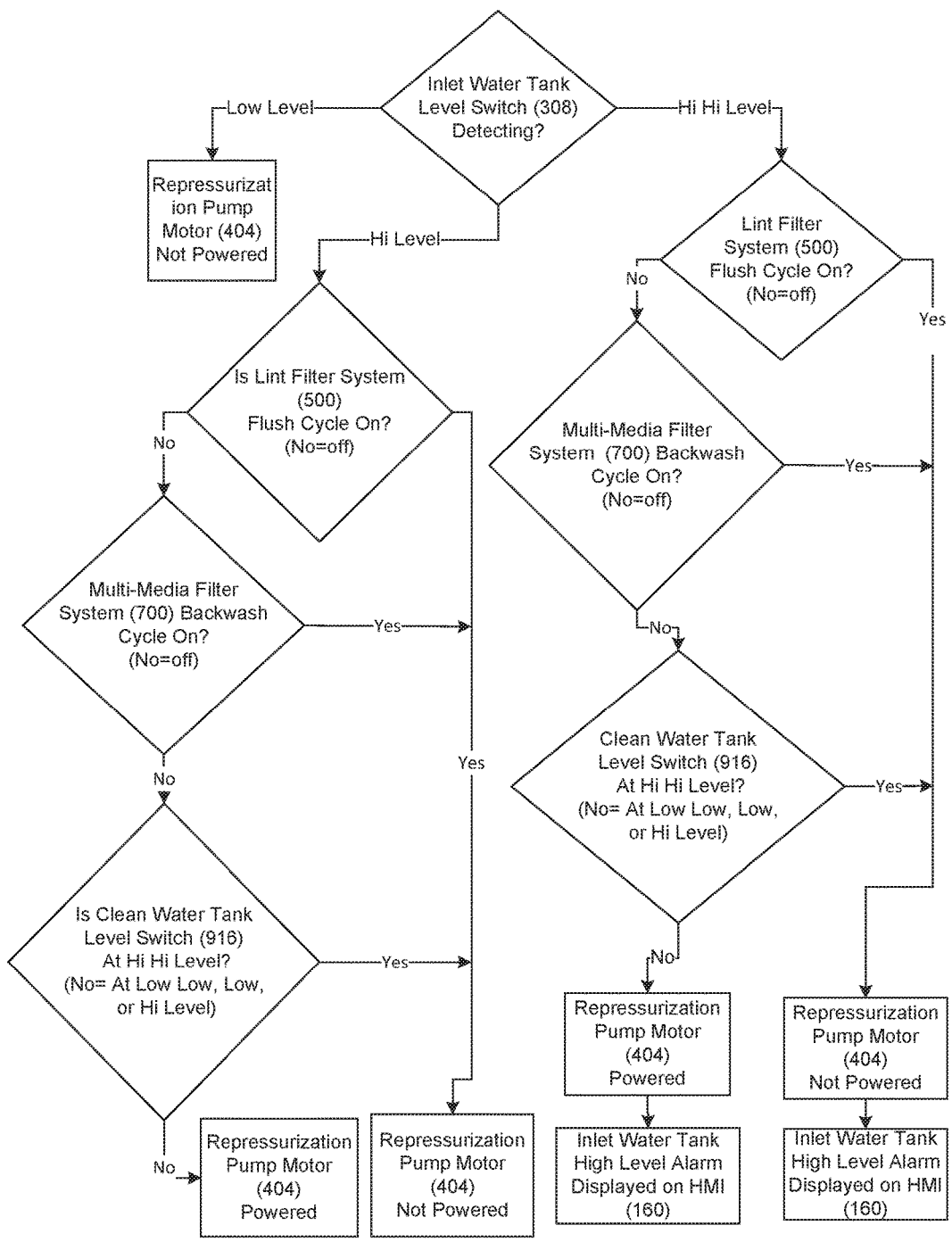
FIG. 14 is a flow diagram view of an embodiment of an inlet water tank repressurization pump control process of the recycle system control process of the laundry wash water recycle system.

Referring to FIG. 14, the main control system process 144 further comprises determining if the inlet water tank level switch 308 is indicating one of three states correlative to the water level in the inlet water tank 302: a Low Level, a Hi Level, and a Hi-Hi Level.

If the inlet water tank level switch 308 indicates a Low Level in the inlet water tank 302, the repressurization pump motor 404 will not be powered. This operation protects the repressurization pump 402 from running dry and the repressurization pump motor 404 from over-heating.

If the inlet water tank level switch 308 indicates a Hi Level in the inlet water tank 302, and the lint filter system 500 flush cycle is on, and/or the multi-media filter system 700 backwash cycle is on, and/or the clean water tank level switch 916 indicates a Hi-Hi Level in the clean water tank 902, then the repressurization pump motor 404 will not be powered. This operation prevents the disruption of the lint filter system 500 flush cycle, the over-heating the repressurization pump motor 404 during the multi-media filter system 700 backwash cycle, and over-filling the clean water tank 902.

If the inlet water tank level switch 308 indicates a Hi Level in the inlet water tank 302, and the lint filter system 500 flush cycle is off, and the multi-media filter system 700 backwash cycle is off, and the clean water tank level switch 916 indicates a Low-Low, Low, or Hi Level in the clean water tank 902, then the repressurization pump motor 404 will be powered.

If the inlet water tank level switch 308 indicates a Hi-Hi Level in the inlet water tank 302, and the lint filter system 500 flush cycle is on, and/or the multi-media filter system 700 backwash cycle is on, and/or the clean water tank level switch 916 indicates a Hi-Hi Level in the clean water tank 902, then the repressurization pump motor 404 will not be powered. This operation prevents the disruption of the lint filter system 500 flush cycle, the over-heating the repressurization pump motor 404 during the multi-media filter system 700 backwash cycle, and over-filling the clean water tank 902. Also, an inlet water tank high level alarm will be indicated on the HMI 160 of the recycle system 10.

If the inlet water tank level switch 308 indicates a Hi-Hi Level in the inlet water tank 302, and the lint filter system 500 flush cycle is off, and the multi-media filter system 700 backwash cycle is off, and the clean water tank level switch 916 indicates a Low-Low, Low, or Hi Level in the clean water tank 902, then the repressurization pump motor 404 will be powered. Also, an inlet water tank high level alarm will be indicated on the HMI 160 of the recycle system 10.

Referring to FIGS. 1 and 2, the lint filter system 500 receives wastewater from the inlet water tank system 300 via the repressurization pump system 400 to remove lint and other large (25-100 microns and larger) solid particles from the wastewater. Treated water from the lint filter system 500 flows to the cyclone system 600 under pressure from the repressurization pump system 400.

Figure 15:
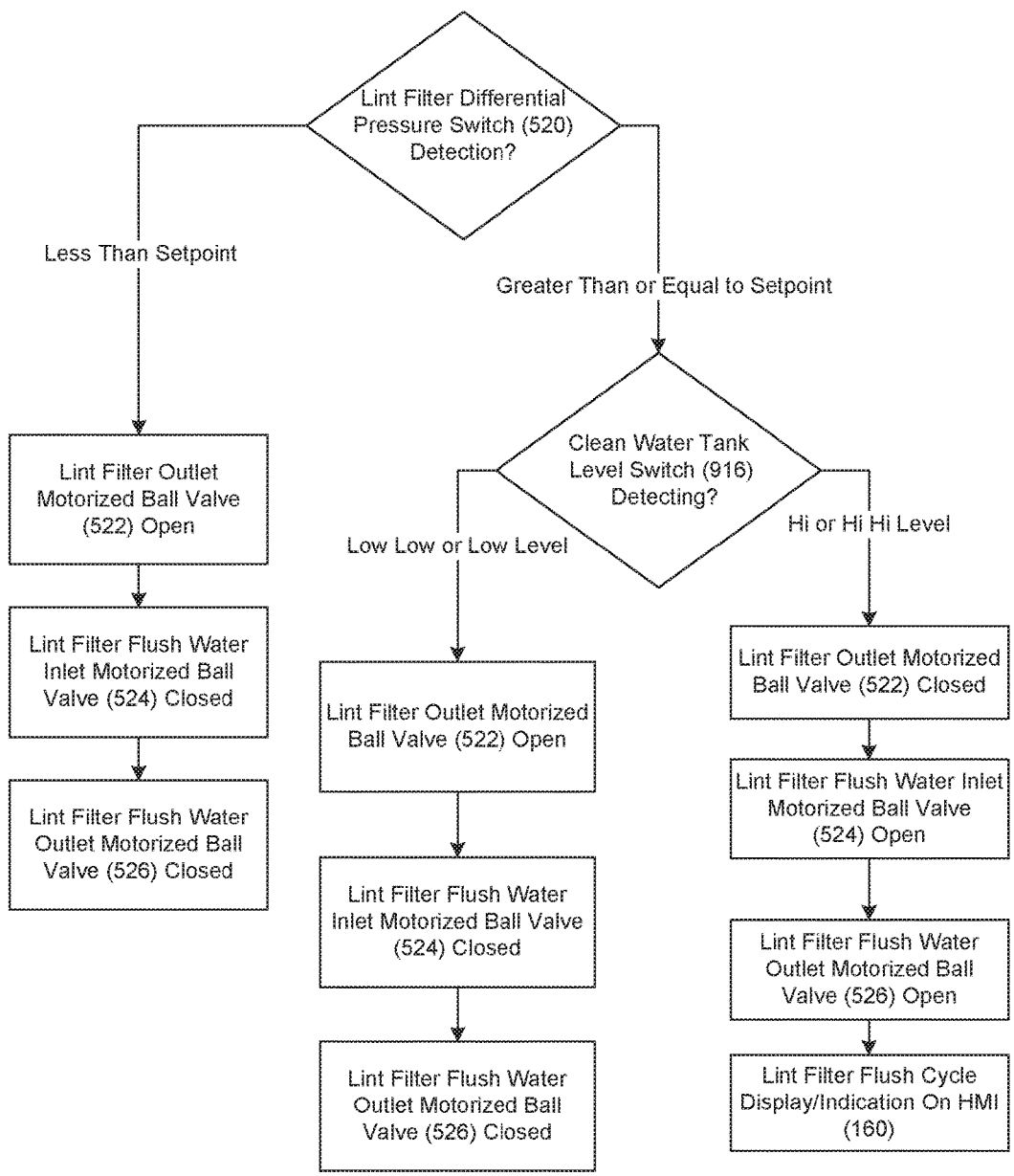
FIG. 15 is a flow diagram view of an embodiment of a lint filter control process of the recycle system control process of the laundry wash water recycle system.

Referring to FIGS. 2 and 15, the main control system process 144 further comprises a lint filter flush cycle process 146. Utilizing the lint filter flush cycle process 146, the lint filter system 500 will automatically clean itself of collected lint/solids with flush water from the clean water pump system 1000 when the differential pressure across the lint filter 502 is excessive, and return to service after the lint filter flush cycle.

Referring to FIG. 15, and in one embodiment, the lint filter system 500 utilizes the lint filter differential pressure switch 520 to indicate or detect two states: a pressure differential state that is less than a predefined setpoint or a pressure differential state that is greater than or equal to the predefined setpoint.

If the lint filter differential pressure switch 520 indicates a differential pressure across the lint filter 502 less the setpoint, then the lint filter outlet motorized ball valve 522 will be in the open position, the lint filter flush water inlet motorized ball valve 524 will be in the closed position, and the lint filter flush water outlet motorized ball valve 526 will be in the closed position. Wastewater will be flow and be filtered through the lint filter system 500.

If the lint filter differential pressure switch 520 indicates a differential pressure across the lint filter 502 greater than or equal to the setpoint and the clean water tank level switch 916 indicates a Low-Low or Low Level in the clean water tank 902, then the lint filter outlet motorized ball valve 522 will be in the open position, the lint filter flush water inlet motorized ball valve 524 will be in the closed position, and the lint filter flush water outlet motorized ball valve 526 will be in the closed position. This operation prevents using too much treated water needed by the washer 22 and/or harming the clean water pump 1002 and the clean water pump motor 1004 by operating dry.

If the lint filter differential pressure switch 520 indicates a differential pressure across the lint filter 502 greater than or equal to the setpoint and the clean water tank level switch 916 indicates a Hi or Hi Level in the clean water tank 902, then the lint filter outlet motorized ball valve 522 will be in the closed position, the lint filter flush water inlet motorized ball valve 524 will be in the open position, and the lint filter flush water outlet motorized ball valve 526 will be in the open position to perform the flush cycle. The duration of the flush cycle is set by the recycle system control program 122 and can be adjusted via the HMI 160. Also, a lint filter flush cycle indication will be shown on the HMI 160 of the recycle system 10.

Figure 16:
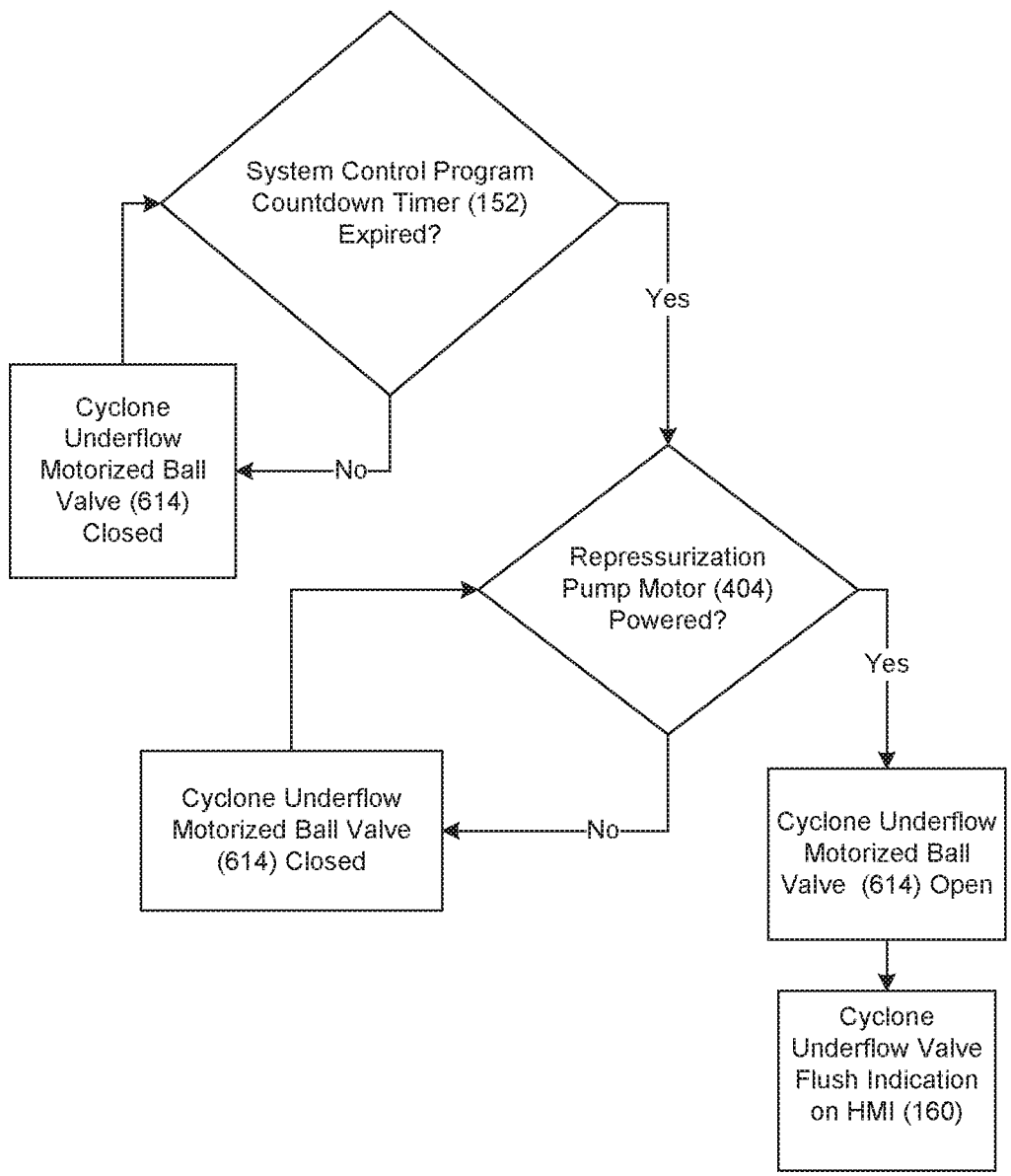
FIG. 16 is a flow diagram view of an embodiment of a cyclone underflow valve flush with countdown timer control process of the recycle system control process of the laundry wash water recycle system.

Referring to FIGS. 1, 2, and 16, and in one embodiment, the cyclone system 600 receives wastewater under pressure from the repressurization pump system 400 and through the lint filter system 500. The cyclone system 600 removes heavier than water solid particles down to 5 microns using centrifugal force within the cyclone 602. The treated water flows to the multi-media filter system 700 and the separated solids with a small amount of water (underflow) continuously flow to the collection sump system 200 through diametrically spaced apart central orifices 618, 620 (FIG. 9) respectively disposed through the normally closed faces of the ball 616 of the cyclone underflow motorized ball valve 614 to allow a controlled flow of solids laden water out of the cyclone 602 and through the ball valve 614 when the ball valve is in the closed position via the cyclone underflow line 608 which empties into the collection sump 202.

Additionally, and in one embodiment, the main control system process 144 further comprises a cyclone underflow flush process 148 that is periodically performed to flush out the underflow line 608 by opening the cyclone underflow motorized ball valve 614 to ensure solids do not build up in the cyclone underflow line 608.

Referring to FIGS. 4 and 16, an embodiment of the cyclone system 600 utilizes the countdown timer 152 within the recycle system control program 122 residing in the PLC 120 of the recycle system 10 to countdown a preset time to expiration.

If the countdown timer 152 has not expired the cyclone underflow motorized ball valve 614 will be in the closed position.

If the countdown timer 152 has expired and the repressurization pump motor 404 has no power (not operating), then the cyclone underflow motorized ball valve 614 will be in the closed position. As there is no flow into the cyclone system 600, there cannot be any flushing of the cyclone underflow line 608.

If the countdown timer 152 has expired and repressurization pump motor 404 has power (operating), then the cyclone underflow motorized ball valve 614 will be in the open position. This operation will allow flushing of the cyclone underflow line 608. The frequency and duration of the underflow flush cycle is set by the recycle system control program 122. The frequency and duration can both be adjusted via the HMI 160 of the recycle system 10. Also, the cyclone underflow flush process will be indicated on the HMI 160 of the recycle system 10.

Figure 17:
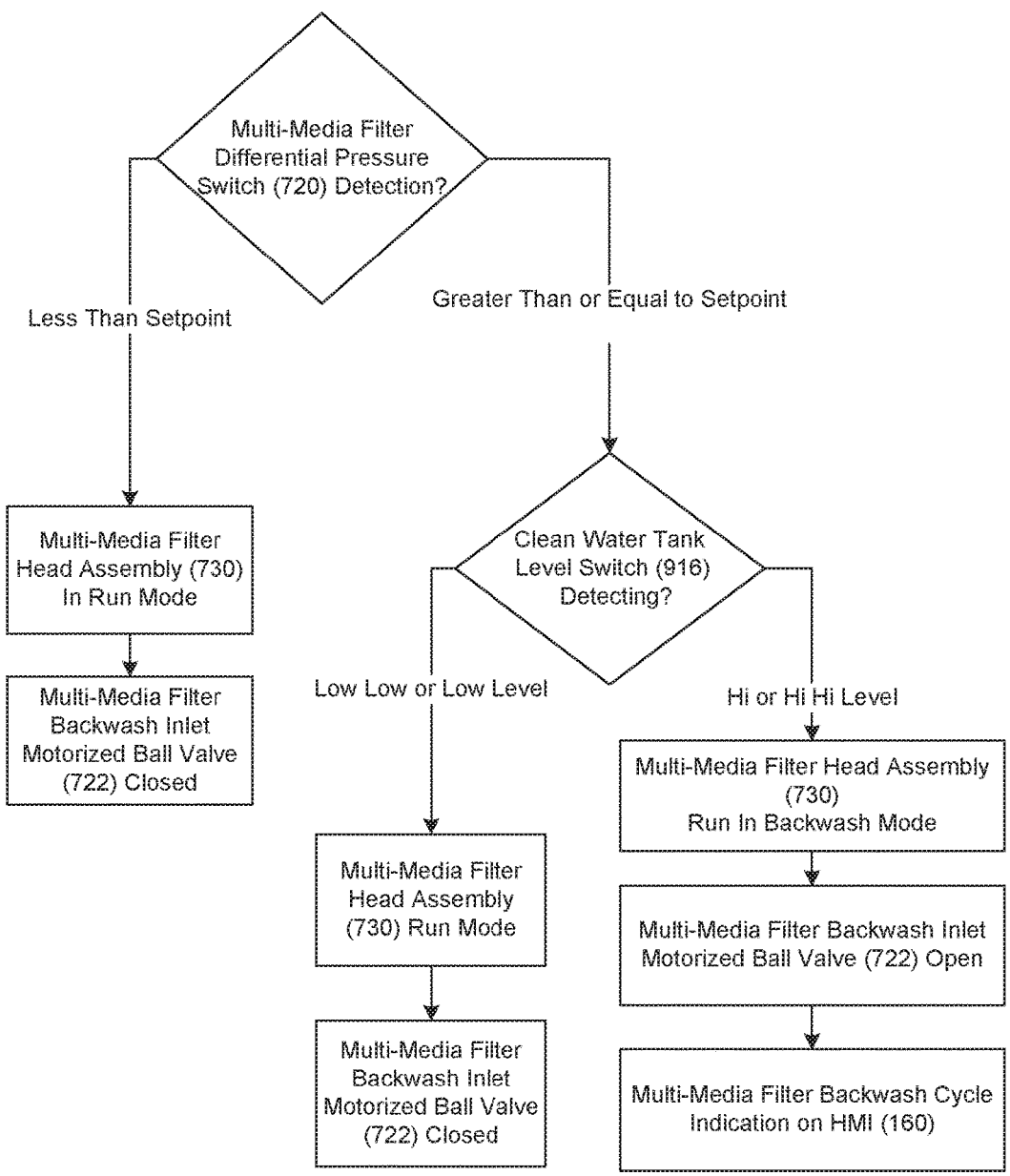
FIG. 17 is a flow diagram view of an embodiment of a multi-media filter control process of the recycle system control process of the laundry wash water recycle system.

Referring to FIGS. 1, 2, and 17, and in one embodiment, the multi-media filter system 700 receives lint filtered and cyclone processed water under pressure from the repressurization pump system 400 after being treated through the lint filter system 500 and the cyclone system 600. The multi-media filter 702 will remove insoluble particles that are lighter or heavier than water using the media bed 732 (FIG. 2) consisting of anthracite, sand, and garnet. Double filtered cyclonically processed advanced oxidation treated water from the multi-media filter system 700 will flow under pressure to the clean water tank system 900 after being treated by the recycle water advanced oxidation system 800.

Referring to FIGS. 4 and 17, the main control system process 144 further comprises a multi-media filter backwash cycle process 150. Utilizing the multi-media filter backwash cycle process 150, the multi-media filter system 700 automatically backwashes the media bed 732 to remove accumulated solids when there is an excessive differential pressure across the media bed, and then returns to service after the backwash cycle 150. Flush water for the backwash cycle 150 is the double filtered cyclonically processed advanced oxidation treated water from the clean water tank system 900 via the clean water pump system 1000. Used, solid-laden backwash water is sent directly to sewer.

Referring to FIG. 17, and in one embodiment, if the multi-media filter differential pressure switch 720 indicates a differential pressure across the multi-media filter 702 that is less than its setpoint, then the multi-media filter head assembly 730 will be in Run Mode and the multi-media filter backwash inlet motorized ball valve 722 will be in the closed position.

If the multi-media filter differential pressure switch 720 indicates a differential pressure across the multi-media filter 702 that is greater than or equal to its setpoint, and the clean water tank level switch 916 indicates a Low-Low or Low Level in the clean water tank 902, then the multi-media filter head assembly 730 will be in Run Mode and the multi-media filter backwash inlet motorized ball valve 722 will be in the closed position. This operation prevents using too much treated water needed by the washer 22 and/or harming the clean water pump 1002 and the clean water pump motor 1004 by operating dry.

If the multi-media filter differential pressure switch 720 indicates a differential pressure across the multi-media filter 702 that is greater than or equal to its setpoint, and the clean water tank level switch 916 indicates a Hi or Hi-Hi Level in the clean water tank 902, then the multi-media filter head assembly 730 will be in the multi-media filter backwash cycle process 150 and the multi-media filter backwash inlet motorized ball valve 722 will be in the open position. Also, the multi-media filter backwash cycle process 150 will be indicated on the HMI 160 of the recycle system 10. The duration of the multi-media filter backwash cycle process 150 is set by the multi-media filter head assembly 730 and is adjusted manually on the multi-media filter head assembly 730.

Figure 18:
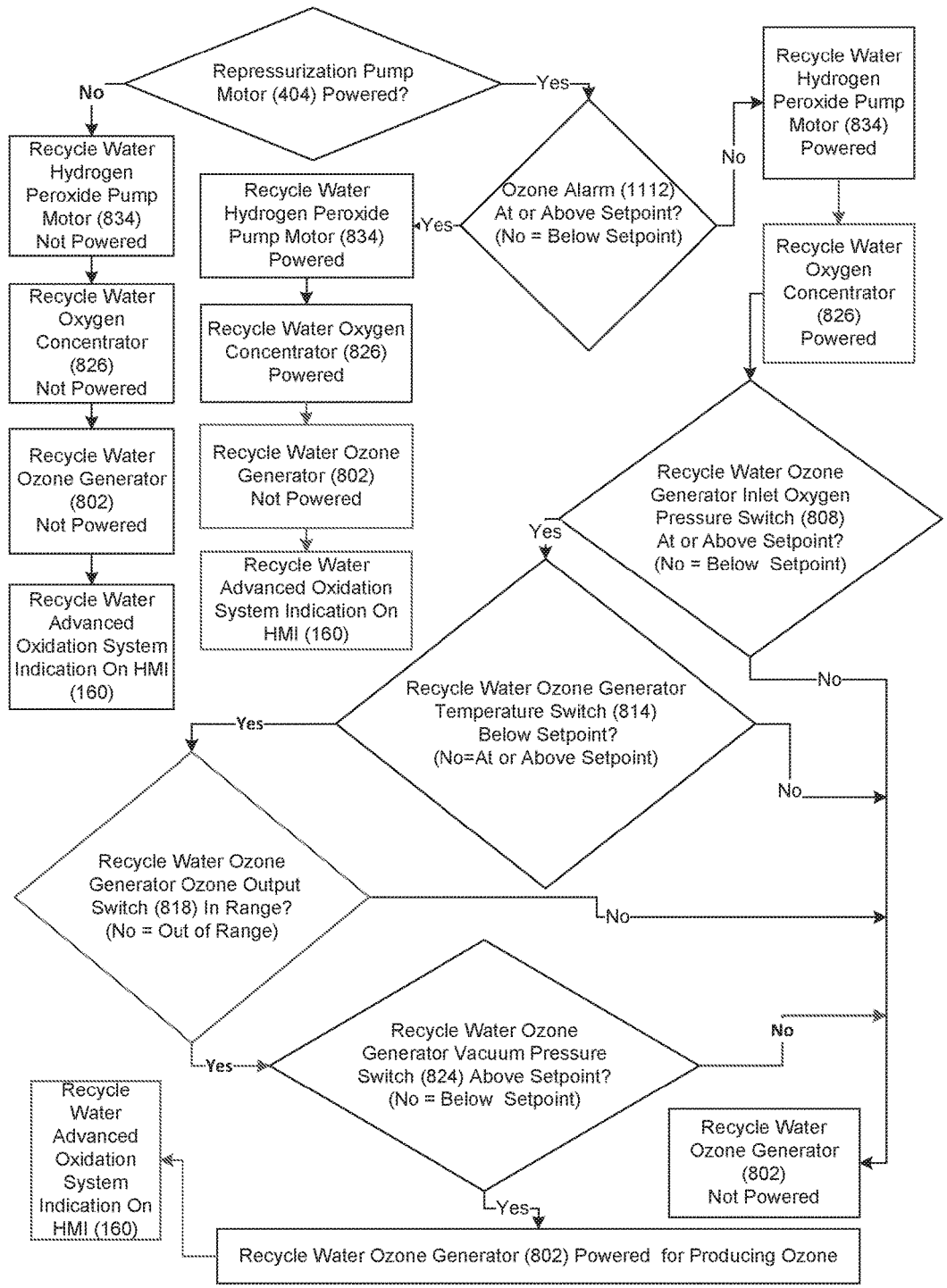
FIG. 18 is a flow diagram view of an embodiment of an advanced oxidation control process of the recycle system control process of the laundry wash water recycle system.

Referring to FIGS. 4 and 18, the main control system process 144 further comprises an advanced oxidation process 154. Utilizing the advanced oxidation process 154, the advanced oxidation system 800 provides treatment of the double filtered cyclonically processed water from the multi-media filter system 700 for producing double filtered cyclonically processed advanced oxidation treated water before it enters the clean water tank system 900.

The advanced oxidation process 154 produces concentrated ozone and provides hydrogen peroxide to create a very strong oxidant, the hydroxyl radical, to disinfect and breakdown any organics remaining in the wastewater after treatment from the lint filter system 500, the cyclone system 600, and the multi-media filter system 700. The oxidizers are directly injected into the pressurized flow of double filtered cyclonically processed water from multi-media filter system 700 and mixed with flash mixer 844 prior to entering the clean water tank system 900 as double filtered cyclonically processed advanced oxidation treated water.

Referring to FIGS. 1, 10, and 18, and in one embodiment, the advanced oxidation process 154 comprises initially determining if the repressurization pump motor 404 is powered or not powered. Also, recycle water advanced oxidation system status indications are provided during this process on the HMI 160 of the recycle system 10.

If the repressurization pump motor 404 is not powered, then the recycle water hydrogen peroxide pump motor 834 is not powered, the recycle water oxygen concentrator 826 is not powered, and the recycle water ozone generator 802 is not powered. This operation prevents the oxidants to be injected with no wastewater flow.

If the repressurization pump motor 404 is powered and the ozone alarm unit 1102 indicates high ozone levels in the working environment of the washer system 20 and/or recycle system 10, then the recycle water hydrogen peroxide pump motor 834 is powered, the recycle water oxygen concentrator 826 is powered, and the recycle water ozone generator 802 is not powered. This operation allows for some oxidant to be injected into the wastewater from the multi-media filter system 700 without adding to the ozone levels in the working environment.

Alternatively, if the repressurization pump motor 404 is powered and the ozone alarm unit 1102 indicates low ozone levels in the working environment of the washer system 20 and recycle system 10, then the recycle water hydrogen peroxide pump motor 834 is powered, the recycle water oxygen concentrator 826 is powered, and the recycle water ozone generator 802 is powered for producing ozone.

If the recycle water ozone generator inlet oxygen pressure switch 808 is at or above its setpoint, the recycle water ozone generator temperature switch 814 is below its setpoint, the recycle water ozone generator ozone output switch 818 is in range, and the recycle water ozone generator vacuum pressure switch 824 is above its setpoint, then the recycle water ozone generator 802 will produce ozone if all of the following four conditions occur: (1) the recycle water ozone generator inlet oxygen pressure switch 808 is below its setpoint, (2) the recycle water ozone generator temperature switch 814 below its setpoint, (3) the recycle water ozone generator ozone output switch 818 is in range, and (4) the recycle water ozone generator vacuum pressure switch 824 is above its setpoint.

On the other hand, if the recycle water ozone generator inlet oxygen pressure switch 808 is below its setpoint, and/or the recycle water ozone generator temperature switch 814 is at or above its setpoint, and/or the recycle water ozone generator ozone output switch 818 is out of range, and/or the recycle water ozone generator vacuum pressure switch 824 is below its setpoint, then the recycle water ozone generator 802 will not produce ozone.

This operation protects the components of the recycle water ozone generator 802.

Referring to FIGS. 1, 2, 4, and 19, the main control system process 144 further comprises a clean water level detection process 156. In one embodiment the clean water tank system 900 receives double filtered cyclonically processed advanced oxidation treated water from the multi-media filter system 700 after being treated by the recycle water advanced oxidation system 800. The clean water tank 902 provides a reservoir of treated water for the clean water pump system 1000 so that double filtered cyclonically processed advanced oxidation treated water can be provided to the washer system 20, the inlet water tank system 300, the lint filter system 500, and the multi-media filter system 700 as needed.

Figure 19:
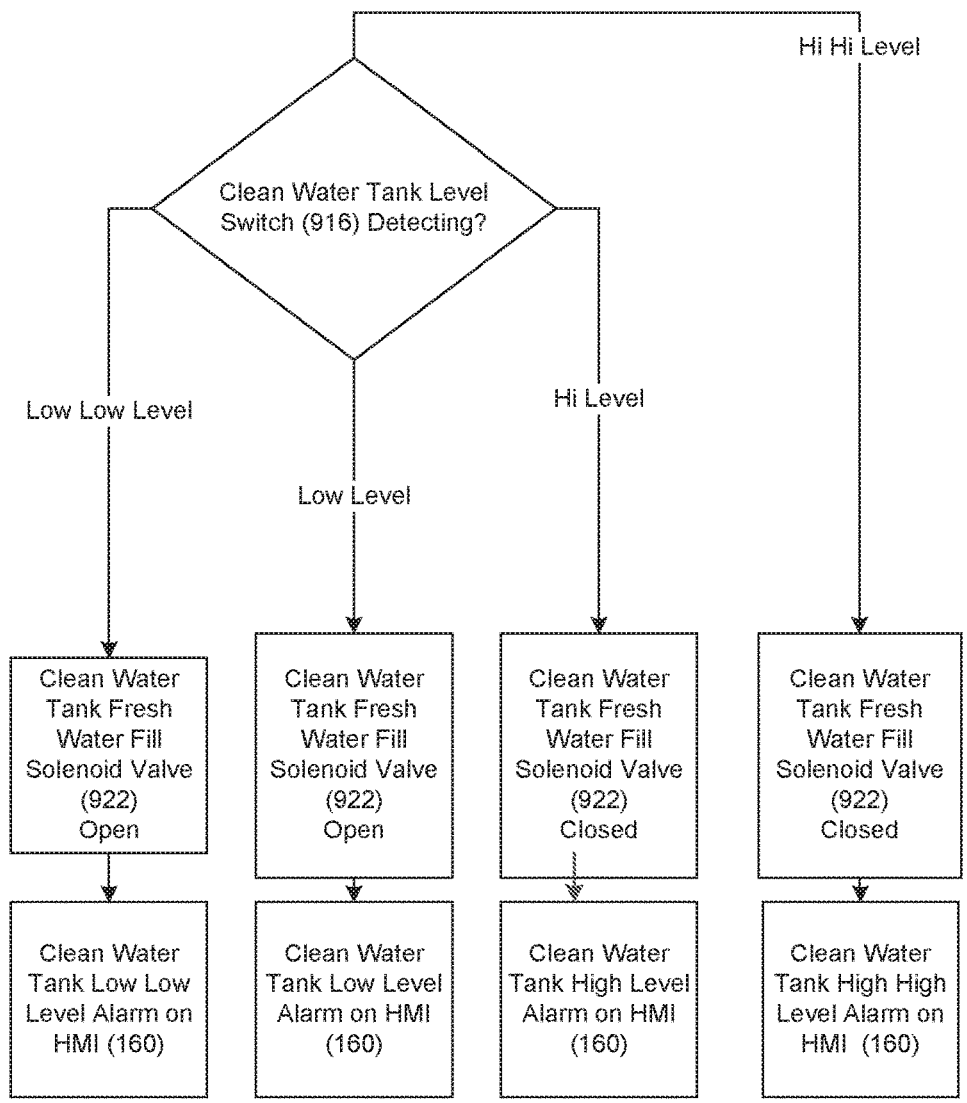
FIG. 19 is a flow diagram view of an embodiment of a clean water tank control process of the recycle system control process of the laundry wash water recycle system.

Referring to FIG. 19, and in one embodiment, the process for the clean water tank system 900 comprises initially determining one of four states of the clean water tank level switch 916 wherein the four states include a Low-Low Level, a Low Level, a Hi Level, and a Hi-Hi Level, which will now be delineated below.

If the clean water tank level switch 916 indicates a Low-Low Level in the clean water tank 902, then the clean water tank fresh water fill solenoid valve 922 will open and a clean water tank Low-Low Level Alarm will be indicated on the HMI 160 of the recycle system 10.

If the clean water tank level switch 916 indicates a Low Level in the clean water tank 902, then the clean water tank fresh water fill solenoid valve 922 will open and a clean water tank Low Level Alarm will be indicated on the HMI 160 of the recycle system 10.

If the clean water tank level switch 916 indicates a Hi Level in the clean water tank 902, then the clean water tank fresh water fill solenoid valve 922 will be in a closed position and a clean water tank Hi Level Alarm will be indicated on the HMI 160 of the recycle system 10.

If the clean water tank level switch 916 indicates a Hi-Hi Level in the clean water tank 902, then the clean water tank fresh water fill solenoid valve 922 will be in a closed position and a Clean Water Tank Hi-Hi Level Alarm will be indicated on the HMI 160 of the recycle system 10.

Clean Water Pump System 1000 with Clean Water Pump Process 158

Referring to FIGS. 1, 2, 4, and 20, the main control system process 144 further comprises a clean water pump process 158. Utilizing the clean water pump process 158, the clean water pump system 1000 transfers treated water from the clean water tank system 900 to the washer system 20, the inlet water tank system 300, the lint filter system 500, and the multi-media filter system 700 as needed. The speed of the clean water pump motor 1004 is controlled using a signal from the clean water pump pressure transducer 1016 to the VFD 170 via the PLC 120 to maintain a constant output pressure from the clean water pump 1002 for varying volume output demands automatically.

Figure 20:
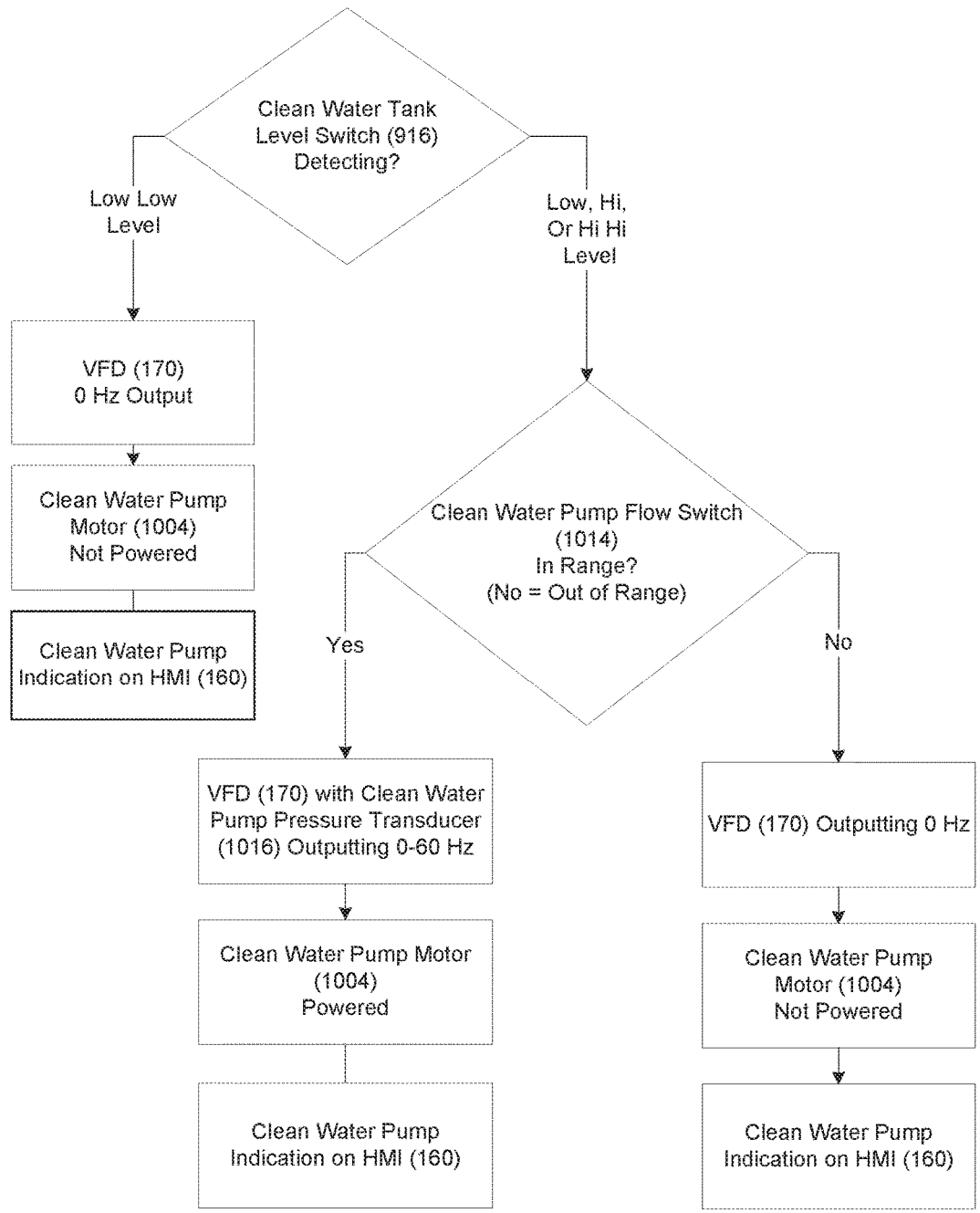
FIG. 20 is a flow diagram view of an embodiment of a clean water pump control process of the recycle system control process of the laundry wash water recycle system.

Referring to FIG. 20, and in one embodiment, the process for the clean water pump system 1000 comprises initially determining if the clean water tank level switch 916 is at a Low-Low Level or any one the following three states: a Low Level, a Hi Level, or a Hi-Hi Level.

If the clean water tank level switch 916 indicates a Low-Low Level in the clean water tank 902, then the VFD 170 output to the clean water pump motor 1004 is 0 Hz and the clean water pump motor 1004 is not powered. Also, a clean water pump status is indicated on the HMI 160 of the recycle system 10. This operation protects the clean water pump 1002 from running dry and the clean water pump motor 1004 from over-heating.

If the clean water tank level switch 916 indicates a Low, Hi, or Hi-Hi Level in the clean water tank 902 and the clean water pump flow switch 1014 is in range, then the VFD 170 output to the clean water pump motor 1004 is 0-60 Hz depending on the signal from the clean water pump pressure transducer 1016 and the clean water pump motor 1004 is powered. Also, a clean water pump status is indicated on the HMI 160 of the recycle system 10.

Alternatively, if the clean water tank level switch 916 indicates a Low, Hi, or Hi-Hi Level in the clean water tank 902 and the clean water pump flow switch 1014 is out of range, then the VFD 170 output to the clean water pump motor 1004 is 0 Hz and the clean water pump motor 1004 is not powered. Also, a clean water pump status is indicated on the HMI 160 of the recycle system 10. This operation protects the clean water pump 1002 and the clean water pump motor 1004 from over-heating.

Referring to FIGS. 1, 2, and 4 the main control system process 144 further comprises an ozone alarm/destruct process 160. The ozone alarm/destruct system 1100 consists of an ozone alarm unit 1102 and an ozone destruct unit 1104 that are powered separately from the washer system 20 and the recycle system 10. Both units are constantly powered. The ozone alarm unit 1102 constantly monitors the working atmosphere of the washer system 20 and recycle system 10 for ozone levels that may be harmful. The ozone destruct unit 1104 constantly treats off-gas from the inlet water tank 302, the lint filter 502, and the clean water tank 902 to remove any ozone prior to venting to the outside.

Figure 21:
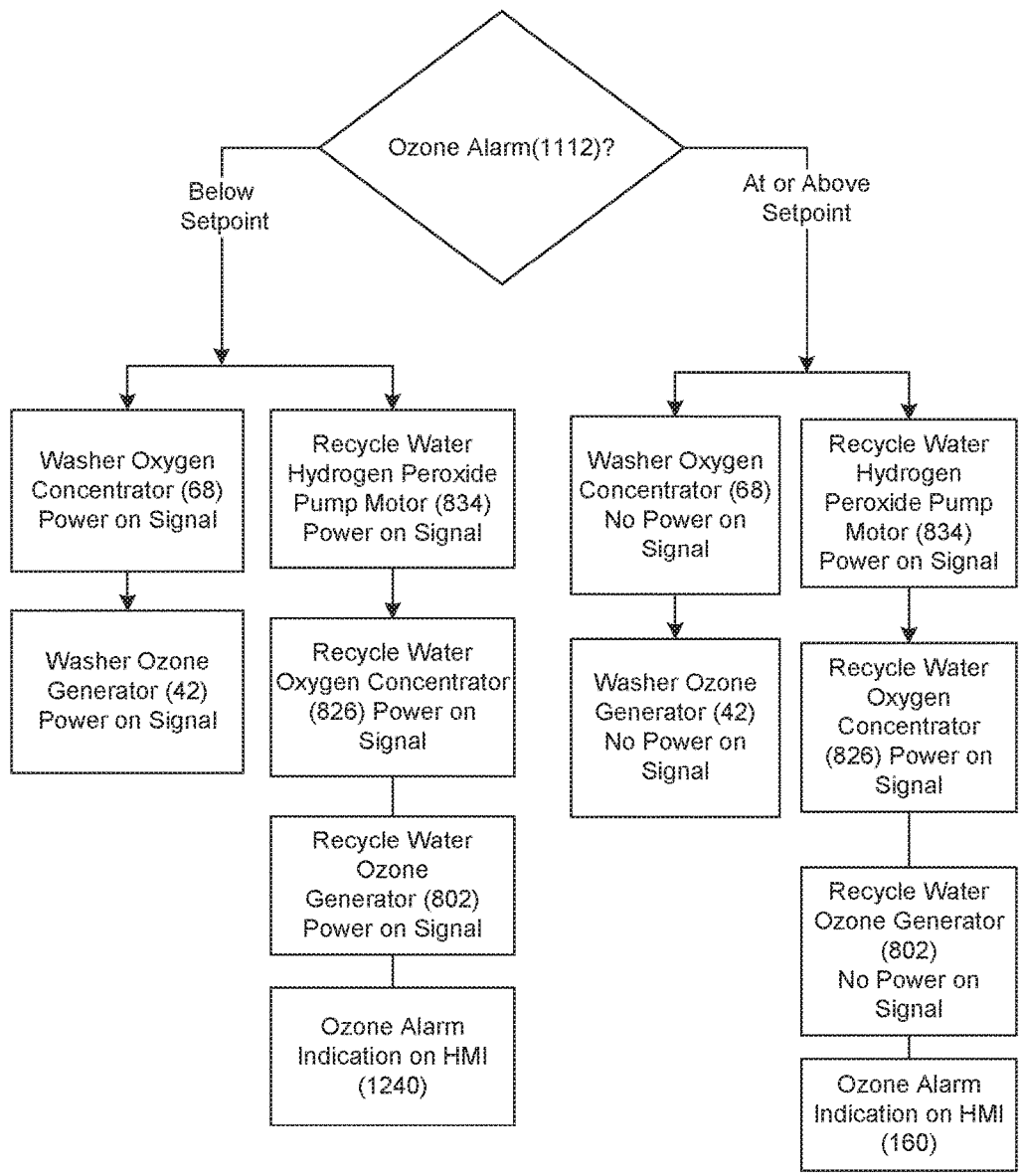
FIG. 21 is a flow diagram view of an embodiment of an ozone alarm destruct control process of the recycle system control process of the laundry wash water recycle system.

Referring to FIGS. 4 and 21, and in one embodiment, the ozone alarm/destruct process 160 comprises iteratively determining if the ozone alarm unit 1102 detects ozone levels below its setpoint or at or above its setpoint.

If the ozone alarm unit 1102 detects ozone levels below its setpoint, then the washer oxygen concentrator 68 will power on signal, the washer ozone generator 42 will power on signal, the recycle water hydrogen peroxide pump motor 834 will power on signal, the recycle water oxygen concentrator 826 will power on signal, the recycle water ozone generator 802 will power on signal, and the ozone alarm status will be indicated on the HMI 160 of the recycle system 10.

In the alternative, if the ozone alarm unit 1102 detects ozone levels at or above its setpoint, then the washer oxygen concentrator 68 will not power on signal, the washer ozone generator 42 will not power on signal, the recycle water hydrogen peroxide pump motor 834 will power on signal, the recycle water oxygen concentrator 826 will power on signal, the recycle water ozone generator 802 will not power on signal, and the ozone alarm status will be indicated on the HMI 160 of the recycle system 10.

The recycle system 10 overall sizing is based on the amount of wastewater to treat from the washer system 20 over a given period and the amount of floor space allocated for the recycle system 10. If floor space is restricted, storage tanks are smaller and treatment equipment is larger to handle more volume of wastewater in a given amount of time. If a large amount of floor space is available, the treatment equipment can be made smaller to treat less volume over a given amount of time with larger storage tanks. The total volume of water in the recycle system 10 is to preferably never exceed the amount that can be recirculated and treated in 6-8 hours of time.

In an aspect, the recycle system 10 uses a total system approach of not only treating the wastewater, but making the wastewater produced from the washers easier to treat. By making the quality of the wastewater easier to treat, the equipment can be simplified and made more compact, and the treatment more effective and consistent. Maintenance is also reduced with easier to treat water using less complex equipment and processes.

In an aspect, the recycle system 10 utilizes ozone in the wash process using ambient temperature water for allowing the advanced oxidation to be more effective than at warmer water temperatures, as the ozone produced for advanced oxidation has a much longer half-life in cooler water, allowing for more hydroxyl radicals to be produced and more oxidation to occur. The result is better removal of contaminants without the need for processes like media absorption, which require frequent media replacement.

Additionally, at ambient water temperature, the recycle treatment equipment does not require insulation or heat exchangers, reducing significantly the equipment cost and making access to the equipment much easier.

Furthermore, ozone use in the wash process allows for less wash chemical addition, resulting in less contaminant within the wastewater and making it easier to treat. Also, wash chemicals (i.e. surfactants) can create issues with filtration by keeping insoluble particles in suspension and making the particles more difficult to remove. Although ozone is a stronger oxidizer than chlorine, it is gentler on laundry than chlorine bleach. A 10-20% increase in the lifespan of fabric can be realized, resulting in a significant cost savings for replacement.

Moreover, ozone in the wash cycles can reduce wash cycle times needed to effectively clean laundry and the laundry retains less water after washing resulting in shorter dryer cycles. The overall effect is that 20-40% less energy (natural gas and/or electricity) is used by the washer. Shorter wash and dryer cycles optimizes the labor time to clean linens.

In an aspect, the recycle system 10 provides a new and unobvious self-cleaning pressurized lint filter 502 that removes lint and large debris from laundry wastewater. Unlike the conventional vibrating shaker screen used in laundry wastewater application, the self-cleaning pressurized lint filter 502 is made as a pressurized unit instead of an atmospheric unit. By being a pressurized unit, one less transfer pump and water storage tank are needed in the process, reducing the footprint and cost of the overall system. Also, the self-cleaning pressurized lint filter 502 design allows for it to clean itself more thoroughly without the need of human intervention or screen replacement, as needed with a vibrating shaker screen. The self-cleaning pressurized lint filter 502 uses a rugged wedge-wire screen that will last many years more than a shaker screen. Also, the new and unobvious spray nozzle assembly 560 and process of use removes debris effectively and extends the maintenance cycle.

In an aspect, the recycle system 10 provides an advanced oxidation system 800 that combines ozone with hydrogen peroxide to produce the hydroxyl radical, the most powerful oxidizer known. By using this powerful oxidizer, the system 10 does not need to use absorbent (i.e. activated carbon) type filtration to effectively remove organics within the wastewater. Absorbent filtration requires the media to be changed when the media is exhausted, so additional maintenance costs are incurred for the replacement media, labor, and disposal. In particular, the amount and strength of oxidant in advanced oxidation is much more than can be generated using UV, so wash chemicals, organics, and bacteria can be more effectively removed from the treated recycle water, eliminating the need for absorbent material to remove these contaminates. Also, the advanced oxidation system 800 produces a consistent high level of oxidizer, where UV production of oxidant reduces as the bulb ages and then finally needs to be replaced.

In an aspect, the system 10 system is constantly recycles clean treated water through all the treatment equipment. The constant movement of water through the equipment keeps water from going stagnant within the equipment and storage tanks during non-production periods. Stagnant water has a greater tendency to degrade with bacterial growth, compromising the quality of the water, and fouling the treatment equipment which increases maintenance. Also, constantly recirculating the treated water allows for all the water within the system 10 to be treated several times, which improves the quality of the treated water and provides a more consistent quality.

In an aspect, the recycle system 10 utilizes at least one cyclone 602 in the form of, but not limited to, at least one a 5-10 micron cyclone to remove small insoluble solids reduces the solids loading to final filtration (multi-media filtration), resulting in less final filtration volume needed and/or less cleaning/backwashing. Therefore, fewer and/or smaller final filters are required and less water is needed to clean/backwash. There is an overall savings in equipment cost, footprint, and water usage.

In an aspect, the recycle system 10 utilizes variable frequency drive (VFD) 170 to provide double filtered cyclonically processed advanced oxidation treated water to the washer(s) on demand while constantly recirculating double filtered cyclonically processed advanced oxidation treated water back through the recycle system 10 and to provide double filtered cyclonically processed advanced oxidation treated water for cleaning of the self-cleaning pressurized lint filter device 502 and multi-media filter 702. The VFD 170 allows the clean water pump 1002 to be ramped up or down with less strain on the clean water pump motor 1004 in comparison to, for example, the on/off operation of a pump on a bladder tank. Accordingly, VFD 170 allows for one pump, clean water pump motor 1004, to be used for various demands as delineated above.

The above delineation of the system 10, including its methods and aspects demonstrate the industrial applicability of this invention.

Moreover, it should be apparent that numerous modifications and adaptations may be resorted to without departing from the scope and fair meaning of this invention as set forth hereinabove and as described herein below by the claims.

We claim:
1. Laundry wash water recycle system, said system comprising:
 a repressurization pump having a suction inlet side and a repressurization outlet side, said suction inlet side operatively coupled to an outlet channel of an inlet tank receiving and storing laundry wash water;
 a series device configuration comprising:
  a self-cleaning lint filter device having a lint filter inlet channel and a lint filter outlet channel, said lint filter inlet channel operatively coupled to said repressurization outlet side of said repressurization pump;
  at least one cyclone having an inlet port and an outlet port, said inlet port operatively coupled to said lint filter outlet channel of said self-cleaning lint filter device; and
  a multi-media filter having an inlet passage and an outlet passage, said inlet passage of said multi-media filter operatively coupled to said outlet port of said at least one cyclone wherein said repressurization pump provides pumping of the wastewater through said series configuration for delivering double filtered cyclonically processed water from said outlet passage of said multi-media filter;
 a clean water tank having an input channel and an output channel, said input channel of said clean water tank operatively coupled to the outlet passage of the multi-media filter for receiving said double filtered cyclonically processed water;
 an advanced oxidation means that combines ozone with hydrogen peroxide to produce a hydroxyl radical for treating said double filtered cyclonically processed water prior to entering said clean water tank for providing a double filtered cyclonically processed advanced oxidation treated water to said clean water tank;
 a clean water feedback line having a first end and a second end, said first end operatively coupled to the inlet tank;
 a clean water pump having an input operatively coupled to said output channel of said clean water tank and an output operatively coupled to said second end of said clean water feedback line and to the at least one washer machine for pumping said double filtered cyclonically processed advanced oxidation treated water from said clean water tank to the at least one washer machine upon demand while continually recirculating or feeding back a stream of said double filtered cyclonically processed advanced oxidation treated water through said clean water feedback line from said clean water tank to the inlet water tank for providing constant recirculation of said double filtered cyclonically processed advanced oxidation treated water through said system; and
 wherein said self-cleaning lint filter device comprises:
  a self-cleaning recirculation housing comprising a bottom having an outer circumscribing periphery transitioning into an upwardly extending circumscribing sidewall terminating to an upper circumscribing lip defining an upper opening of said self-cleaning recirculation housing;
  a lid mounted on said upper circumscribing lip of said self-cleaning recirculation housing forming a pressurized self-cleaning lint filter device;
  said upwardly extending circumscribing sidewall having an interior circumscribing surface defining a circumscribing main chamber that extends along and circumscribes a central longitudinal axis of said self-cleaning recirculation housing;
  a cylindrical screen filter disposed within said self-cleaning recirculation housing, said cylindrical screen filter having a diameter less than an interior diameter of said self-cleaning recirculation housing;
  said cylindrical screen filter having an inferior end abutting an interior surface of said bottom of said self-cleaning recirculation housing and a superior circumscribing collar radially extending away from a superior end of said cylindrical body of said cylindrical screen filter and circumferentially spacing said cylindrical body of said cylindrical screen filter away from said interior circumscribing surface of said self-cleaning recirculation housing for forming a hollow cylindrically shaped envelope between an exterior of said cylindrical body of said cylindrical screen filter and said interior circumscribing surface of said self-cleaning recirculation housing; and
  wherein said hollow cylindrically shaped envelope is bounded by said superior circumscribing collar of said cylindrical screen filter, said bottom of said self-cleaning recirculation housing, said interior circumscribing surface of said self-cleaning recirculation housing, and said exterior surface of said cylindrical screen filter.

2. The system of claim 1 wherein said lint filter inlet channel is disposed through said self-cleaning recirculation housing at an elevation above said bottom of said self-cleaning recirculation housing for providing open fluid communication to said hollow cylindrically shaped envelope disposed between said interior circumscribing surface of said self-cleaning recirculation housing and said exterior of said cylindrical body of said cylindrical screen filter to filter from said exterior to an interior of said cylindrical body of said cylindrical screen filter.

3. The system of claim 2 further comprising a spray nozzle assembly, said spray nozzle assembly comprising:
 a vertical blind bore conduit assembly extending between a closed inferior end and an open superior end,
 said vertical blind bore conduit assembly centrally disposed within said self-cleaning recirculation housing and circumscribed by and radially spaced from an interior surface of said cylindrical screen filter with said closed inferior end spaced from said bottom of said self-cleaning recirculation housing and said open superior end in fluid communication with a water source;
 a plurality of pairs of opposing radially outwardly facing spray nozzles vertically spaced apart and circumferentially distributed in a sequentially staggered pattern along a central axis of said vertical blind bore conduit assembly and in open fluid communication with said blind bore to discharge a spray from said plurality of pairs of opposing radially outwardly facing spray nozzles in a direction from said interior of said cylindrical body of said cylindrical screen filter to said exterior of said cylindrical body of said cylindrical screen filter.

4. The system of claim 3 further comprising an underflow valve operatively coupled to a discharge bottom of said at least one cyclone, said underflow valve comprising:
 a ball valve having two normally closed faces each comprising a central orifice disposed therethrough for defining a pair of opposing, diametrically spaced apart central orifices disposed through said normally closed faces to allow a controlled flow of solids laden water out of a discharge bottom of said at least one cyclone while said ball valve is in the closed position; and
 said ball valve having normally opened faces of a normal passageway extending through the ball valve for allowing greater fluid flow while in said open position than said closed position wherein said pair of opposing, diametrically spaced apart central orifices of said normally closed faces has a central axis substantially perpendicular to a central axis of said normally opened faces of said normal passageway extending through said ball valve.

5. Laundry wash water recycle system, said system comprising:
 a repressurization pump having a suction inlet side and a repressurization outlet side, said suction inlet side operatively coupled to an outlet channel of an inlet tank receiving and storing laundry wash water;
 a series device configuration comprising:
  a self-cleaning lint filter device having a lint filter inlet channel and a lint filter outlet channel, said lint filter inlet channel operatively coupled to said repressurization outlet side of said repressurization pump;
  at least one cyclone having an inlet port and an outlet port, said inlet port operatively coupled to said lint filter outlet channel of said self-cleaning lint filter device; and
  a multi-media filter having an inlet passage and an outlet passage, said inlet passage of said multi-media filter operatively coupled to said outlet port of said at least one cyclone wherein said repressurization pump provides pumping of the wastewater through said series configuration for delivering double filtered cyclonically processed water from said outlet passage of said multi-media filter;
 a clean water tank having an input channel and an output channel, said input channel of said clean water tank operatively coupled to the outlet passage of the multi-media filter for receiving said double filtered cyclonically processed water;
 an advanced oxidation means that combines ozone with hydrogen peroxide to produce a hydroxyl radical for treating said double filtered cyclonically processed water prior to entering said clean water tank for providing a double filtered cyclonically processed advanced oxidation treated water to said clean water tank;
 a clean water feedback line having a first end and a second end, said first end operatively coupled to the inlet tank;
 a clean water pump having an input operatively coupled to said output channel of said clean water tank and an output operatively coupled to said second end of said clean water feedback line and to the at least one washer machine for pumping said double filtered cyclonically processed advanced oxidation treated water from said clean water tank to the at least one washer machine upon demand while continually recirculating or feeding back a stream of said double filtered cyclonically processed advanced oxidation treated water through said clean water feedback line from said clean water tank to the inlet water tank for providing constant recirculation of said double filtered cyclonically processed advanced oxidation treated water through said system; and
 an underflow valve operatively coupled to a discharge bottom of said at least one cyclone, said underflow valve comprising:
  a ball valve having two normally closed faces each comprising a central orifice disposed therethrough for defining a pair of opposing, diametrically spaced apart central orifices disposed through said normally closed faces to allow a controlled flow of solids laden water out of a discharge bottom of said at least one cyclone while said ball valve is in the closed position; and
  said ball valve having normally opened faces of a normal passageway extending through the ball valve for allowing greater fluid flow while in said open position than said closed position.

6. The system of claim 5 wherein said pair of opposing, diametrically spaced apart central orifices of said normally closed faces has a central axis substantially perpendicular to a central axis of said normally opened faces of said normal passageway extending through said ball valve.

\* \* \* \* \*